(12) United States Patent
Hu et al.

(10) Patent No.: US 11,993,863 B2
(45) Date of Patent: May 28, 2024

(54) METAL PRODUCT, METHOD FOR MANUFACTURING THE METAL PRODUCT, AND METAL COMPOSITE

(71) Applicant: Fulian Yuzhan Precision Technology Co.,Ltd, Shenzhen (CN)

(72) Inventors: Yu-Mei Hu, Shenzhen (CN); Shi-Chu Xue, Shenzhen (CN); Li-Ming Shen, Shenzhen (CN); Zheng-Quan Wang, Shenzhen (CN); Dong-Xu Zhang, Shenzhen (CN); Zhong-Hua Mai, Shenzhen (CN); An-Li Qin, New Taipei (TW); Qing-Rui Wang, Shenzhen (CN); Ching-Hao Yang, New Taipei (TW); Kar-Wai Hon, New Taipei (TW); Hao Zhou, Shenzhen (CN)

(73) Assignee: Fulian Yuzhan Precision Technology Co., Ltd, Shenzhen (CN)

( * ) Notice: Subject to any disclaimer, the term of this patent is extended or adjusted under 35 U.S.C. 154(b) by 0 days.

(21) Appl. No.: 17/484,259

(22) Filed: Sep. 24, 2021

(65) Prior Publication Data

US 2022/0098754 A1 Mar. 31, 2022

(30) Foreign Application Priority Data

Sep. 25, 2020 (CN) .......................... 202011025925.3
Sep. 25, 2020 (CN) .......................... 202011025932.3

(51) Int. Cl.
*C25F 3/04* (2006.01)
*C25D 11/08* (2006.01)
(Continued)

(52) U.S. Cl.
CPC ................ *C25F 3/04* (2013.01); *C25D 11/08* (2013.01); *F16S 1/08* (2013.01); *F16S 1/10* (2013.01)

(58) Field of Classification Search
CPC ....................................................... C25F 3/04
See application file for complete search history.

(56) References Cited

U.S. PATENT DOCUMENTS

| 7,150,767 B1 | 12/2006 | Schneider et al. |
| 2012/0200932 A1 | 8/2012 | Minari et al. |

FOREIGN PATENT DOCUMENTS

| CN | 102575373 A | 7/2012 | |
| CN | 109183108 A | 1/2019 | |
| CN | 112342508 A * | 2/2021 | ........... C23C 14/165 |

OTHER PUBLICATIONS

English translation of CN109183108 (Dong et al.) obtained form espacenet on Feb. 23, 2023 (Year: 2023).*

(Continued)

*Primary Examiner* — Adam Krupicka
(74) *Attorney, Agent, or Firm* — ScienBiziP, P.C.

(57) ABSTRACT

A metal product includes a metal substrate, at least one first hole, at least one second hole, and at least one third hole. The first hole is formed in a surface of the metal substrate. The second hole is formed in at least one of a portion of the surface of the metal substrate without the first hole and an inner surface defining the first hole. The third hole is formed in at least one of a portion of the surface of the metal substrate without the first hole and without the second hole, a portion of the inner surface defining the first hole without the second hole, and an inner surface defining the second hole. The first, second, and third holes enhance a bonding strength between the metal product and a material product. The disclosure also provides a metal composite and a method for manufacturing the metal product.

16 Claims, 20 Drawing Sheets

(51) Int. Cl.
 *F16S 1/08* (2006.01)
 *F16S 1/10* (2006.01)

(56) References Cited

OTHER PUBLICATIONS

English translation of CN112342508 from EPO espacenet, obtained Sep. 8, 2023. (Year: 2023).*

* cited by examiner

Put a metal substrate into a first electrolyte as an anode, and put a first cathode conductor in the first electrolyte as a cathode; then apply electricity on the metal substrate and the first cathode conductor to electrolyze the metal substrate, thereby forming at least one first hole and at least one second hole in the metal substrate; wherein the first electrolyte includes persulfate ⸺ X11

Put the metal substrate with the first hole and the second hole into a second electrolyte as an anode, and put a second cathode conductor in the second electrolyte as a cathode; then apply electricity on the metal substrate and the second cathode conductor to perform an anodic oxidation treatment, thereby forming at least one third hole in at least one of a surface of the metal substrate without the first hole and without the second hole, an inner surface defining the first hole, and an inner surface defining the second hole ⸺ X12

FIG. 16

METAL PRODUCT, METHOD FOR MANUFACTURING THE METAL PRODUCT, AND METAL COMPOSITE

CROSS-REFERENCE TO RELATED APPLICATIONS

This application claims all benefits accruing under 35 U.S.C. § 119 from Chinese Patent Application No. 202011025932.3 filed on Sep. 25, 2020, and Chinese Patent Application No. 202011025925.3 filed on Sep. 25, 2020, in the State Intellectual Property Office of China, the entire contents of which are incorporated herein by reference.

FIELD

The present disclosure relates to metal materials, and more particularly, the present disclosure relates to a metal product, a metal composite including the metal product, and a method for manufacturing the metal product.

BACKGROUND

Due to the requirements of physical and chemical properties of materials such as strength, appearance and density of industrial products, the use of metals alone may not meet these requirements. Metal composites retain the characteristics of metal materials while introducing the characteristics of other materials. It is currently used as a material for industrial products. However, in actual production, because the metal composite involves the composite of two or more materials, the bonding strength between these materials may be insufficient, resulting in poor performances in air proof and water proof.

SUMMARY

In view of the above situation, it is necessary to provide a metal product to be effectively combined with other materials. A method for manufacturing such metal product and a metal composite including the metal product are also provided.

According to some embodiments, a metal product includes a metal substrate, at least one first hole, at least one second hole, and at least one third hole. The at least one first hole is formed in a surface of the metal substrate. The at least one second hole is formed in at least one of a portion of the surface of the metal substrate without the first hole and an inner surface defining the at least one first hole. The at least one third hole is formed in at least one of a portion of the surface of the metal substrate without the at least one first hole and without the at least one second hole, a portion of the inner surface defining the at least one first hole without the at least one second hole, and an inner surface defining the at least one second hole.

According to some embodiments, the at least one second hole is formed by recessing from the metal substrate or is formed by surrounding at least one protrusion on the metal substrate.

According to some embodiments, the at least one protrusion is formed on at least one of: the portion of the surface of the metal substrate without the at least one first hole, and the inner surface defining the at least one first hole. The at least one protrusion surrounds to form the at least one second hole. The third hole is formed in at least one of: a surface of the at least one protrusion, and a surface of the metal substrate exposed from the at least one protrusion.

According to some embodiments, a material of the inner surface defining the at least one first hole and exposed from the at least one protrusion includes oxide.

According to some embodiments, a diameter $R_1$ of each of the at least one first hole satisfies 50 μm≤$R_1$≤150 μm.

According to some embodiments, a diameter $R_2$ of each of the at least one second hole satisfies 100 nm≤$R_2$≤5000 nm.

According to some embodiments, a diameter $R_3$ of each of the at least one third hole satisfies 20 nm≤$R_3$≤70 nm.

According to some embodiments, the at least one second hole and the inner surface defining the at least one second hole together have a spongy structure.

According to some embodiments, the metal product includes a plurality of second holes, and each of the plurality of second holes includes an opening. Directions of the openings of the plurality of second holes are different from each other.

According to some embodiments, the metal product includes a plurality of second holes, and shapes of the plurality of second holes are different from each other.

According to some embodiments, the metal product includes a plurality of third holes, and each of the plurality of third holes includes an opening. Directions of the openings of the plurality of third holes are different from each other.

According to some embodiments, a method for manufacturing a metal product includes: putting a metal substrate into a first electrolyte as an anode, and putting a first cathode conductor in the first electrolyte as a cathode, wherein the first electrolyte includes persulfate; applying electricity on the metal substrate and the first cathode conductor to electrolyze the metal substrate, thereby forming at least one first hole and at least one second hole in the metal substrate; putting the metal substrate with the at least one first hole and the at least one second hole into a second electrolyte as an anode, and putting a second cathode conductor in the second electrolyte as a cathode; applying electricity on the metal substrate and the second cathode conductor to perform an anodic oxidation treatment, thereby forming at least one third hole in at least one of a surface of the metal substrate without the at least one first hole and without the at least one second hole, an inner surface defining the at least one first hole, and an inner surface defining the at least one second hole.

According to some embodiments, the persulfate is selected from a group consisting of potassium persulfate, sodium persulfate, ammonium persulfate, and any combination thereof.

According to some embodiments, a concentration C of the persulfate in the first electrolyte satisfies 10 g/L≤C≤200 g/L.

According to some embodiments, a metal composite includes the above metal product and a material product formed on the metal product. The material product includes a combining portion arranged in the at least one first hole, the at least one second hole, and the at least one third hole to be combined with the metal product.

According to some embodiments, the material product is made of a material selected form a group consisting of plastic, metal, ceramic, glass, oxide, and any combination thereof.

According to some embodiments, the combining portion includes at least one first part embedded into the at least one first hole, at least one second part diverging from the at least one first part, and at least one third part diverging from the at least one first part and the at least one second part. The at least one second part is embedded into the at least one second hole. The at least one third part is embedded into the at least one third hole.

According to some embodiments, the combining portion includes a main body and at least one branch structure diverging from the main body.

According to some embodiments, the combining portion includes a plurality of branch structures, shapes of the plurality of branch structures are different from each other.

According to some embodiments, the combining portion includes a plurality of branch structures, divergence directions of the plurality of branch structures are different from each other.

The at least one first hole and the at least one second hole is formed by electrolysis using the first electrolyte including persulfate. The first electrolyte does not include acidic substances with nitrogen and phosphorus, so that the at least one first hole can be formed in the surface of the metal substrate, and the at least one second hole can also be formed under an action of persulfate at the same time. Then, the at least one third hole is formed by anodic oxidation in the second electrolyte, thereby obtaining the metal product. The first electrolyte and the second electrolyte do not include halogen-containing substances such as chlorine or fluorine, thereby preventing the residual electrolyte from further corroding the metal substrate.

The plurality of protrusions with strong bonding strength to the metal substrate are formed in a controllable manner on the surface of the metal substrate with the at least one micron-sized first hole by glancing angle physical vapor deposition. Then, the at least one sub-micron-sized second hole is formed between the plurality of protrusions. Finally, at least one nano-sized third hole is formed by the anodic oxidation treatment.

Since the material product is embedded in the at least one first hole, the at least one second hole, and the at least one third hole, the bonding strength between the metal product and the material product is enhanced. At the same time, since a triple (or three-layer) composite structure of the at least one first hole, the at least one second hole, and the at least one third hole includes a complicated pore structure, it is more difficult for external gases and liquids to pass through the triple (or three-layer) composite structure, thereby improving an air tightness and liquid tightness of the metal composite.

BRIEF DESCRIPTION OF THE DRAWINGS

Implementations of the present disclosure will now be described, by way of example only, with reference to the attached figures.

FIG. 16 is a flowchart of a method for manufacturing a metal product, in accordance with some embodiments of the present disclosure.

DETAILED DESCRIPTION

Figure 1:
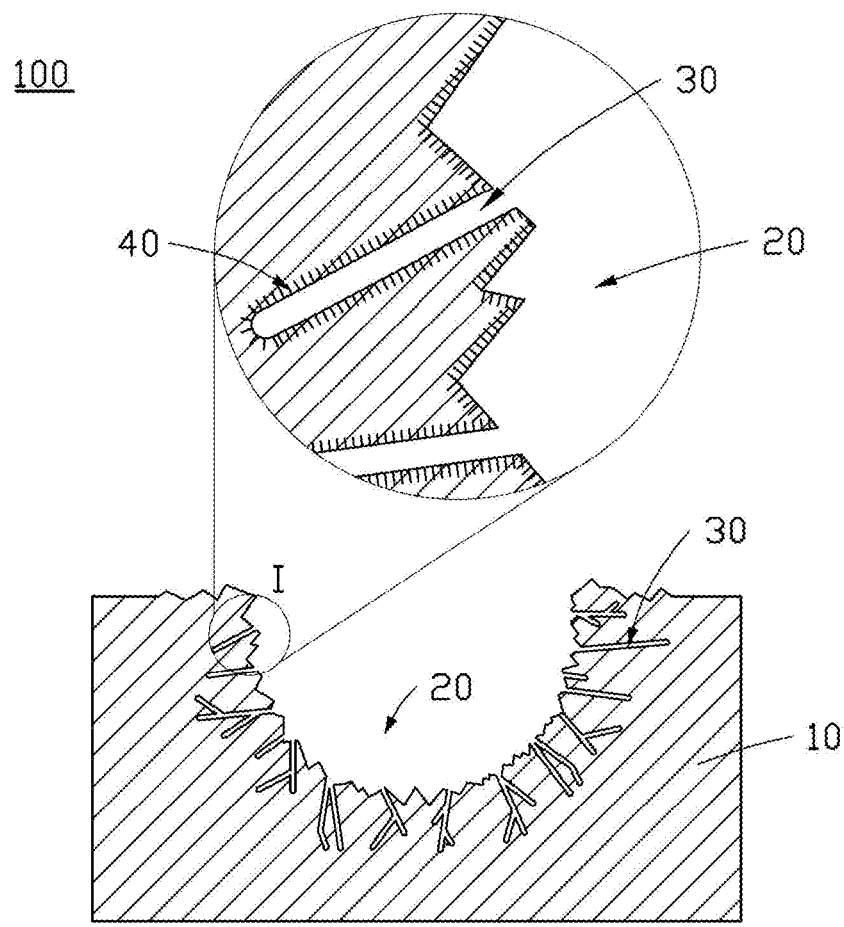
FIG. 1 is a simplified cross-sectional side view of a metal product, and an enlarged view in area I of the metal product, in accordance with some embodiments of the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale, and the proportions of certain parts may be exaggerated to better illustrate details and features of the present disclosure.

The term "comprising," when utilized, means "including, but not necessarily limited to"; it specifically indicates open-ended inclusion or membership in the so-described combination, group, series, and the like.

In some embodiments illustrated in FIG. 1, a metal product 100 is provided. The metal product 100 includes a metal substrate 10, at least one first hole 20, at least one second hole 30, and at least one third hole 40. The at least one first hole 20 is formed in a surface of the metal substrate 10. The at least one second hole 30 is formed in an inner surface defining the at least one first hole 20. The at least one third hole 40 is formed in at least one of a portion of the surface of the metal substrate 10 without the at least one first hole 20 and without the at least one second hole 30, a portion of the inner surface defining the at least one first hole 20 without the at least one second hole 30, and an inner surface defining the at least one second hole 30.

The metal substrate 10 may be made of a material selected from a group consisting of aluminum, aluminum alloy, and any combination thereof.

According to some embodiments, the at least one first hole 20 may be formed in one surface of the metal substrate 10. According to some embodiments, a plurality of first holes 20 may be formed in a plurality of surfaces of the metal substrate 10.

Figure 2:
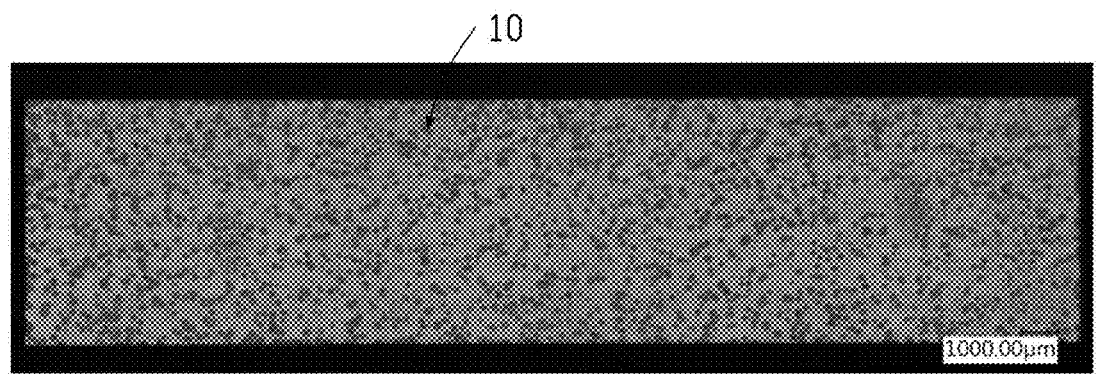
FIG. 2 is an optical microscope (OM) image of a metal product, in accordance with some embodiments of the present disclosure.
Figure 3:
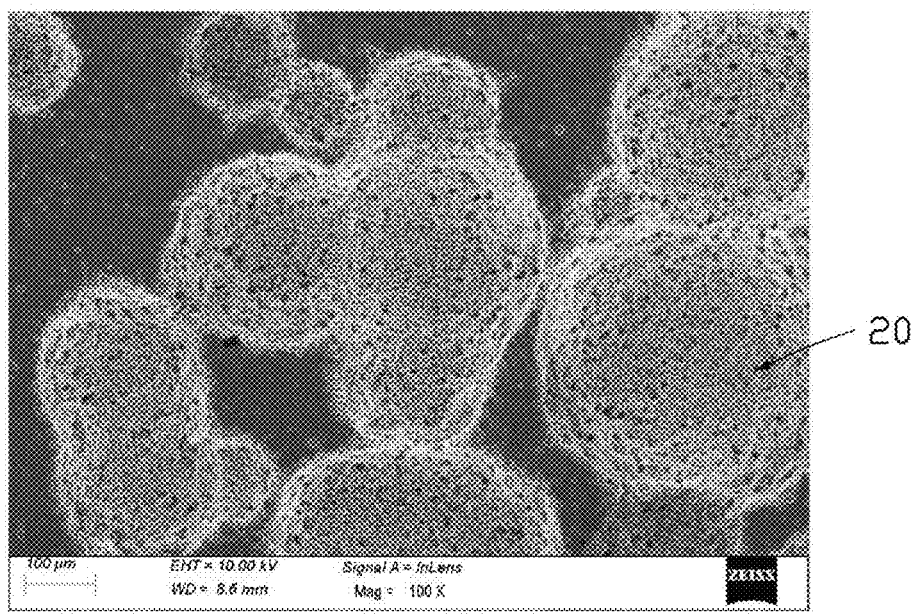
FIG. 3 is a scanning electron microscope (SEM) image of a metal product, in accordance with some embodiments of the present disclosure.

In some embodiments illustrated in FIGS. 2 and 3, a diameter of each of the at least one first hole 20 is defined as $R_1$. The range of the diameter $R_1$ satisfies 100 µm≤$R_1$≤150 µm, that is, each of the at least one first hole 20 is approximately a micron-sized hole. According to some embodiments, a lower limit of the diameter $R_1$ is one of 102 µm, 108 µm, 115 µm, 120 µm, 126 µm, 129 µm, 137 µm, and 148 µm. An upper limit of the diameter $R_1$ is one of 103 µm, 109 µm, 118 µm, 123 µm, 128 µm, 139 µm, 141 µm, and 149 µm. The lower limit of the diameter $R_1$ is less than or equal to the upper limit of the diameter $R_1$.

Figure 4:
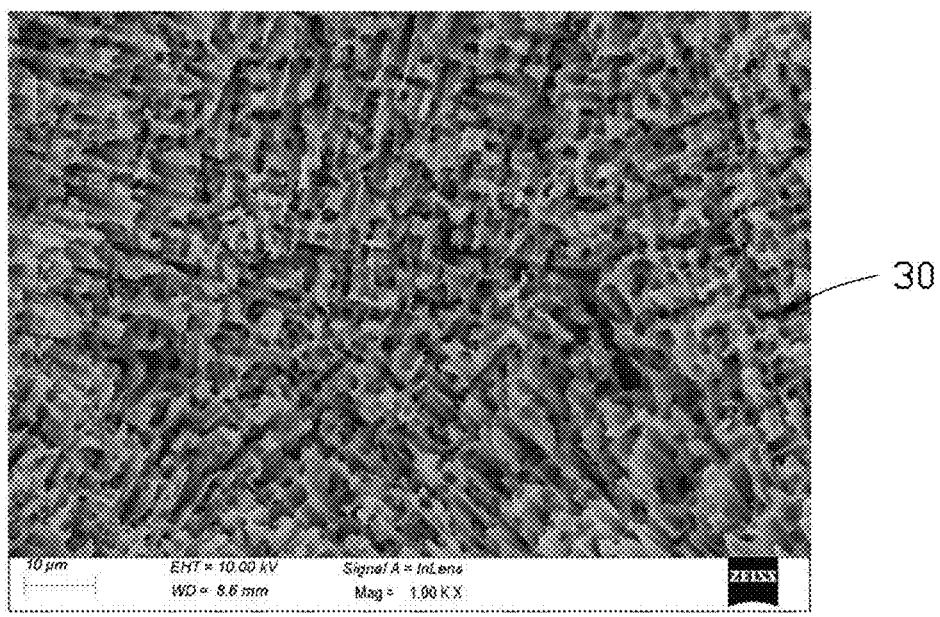
FIG. 4 is a SEM image of a metal product, in accordance with some embodiments of the present disclosure.
Figure 5:
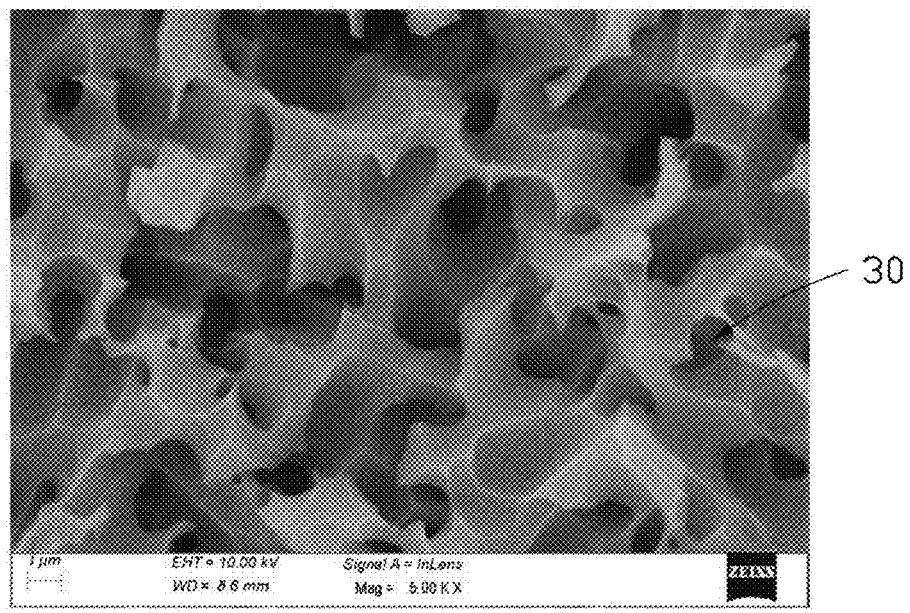
FIG. 5 is a SEM image of a metal product, in accordance with some embodiments of the present disclosure.

In some embodiments illustrated in FIGS. 4 and 5, the inner surface of the at least one first hole 20 is recessed inward to form a plurality of second holes 30 (shown in the area I of FIG. 1), and each of the plurality of second holes 30 is irregular in shape. According to some embodiments, each of the plurality of second holes 30 may be a substantially elongated slit and extend in a direction away from the inner surface of the first hole 20, that is, each of the plurality of second holes 30 may be a substantially elongated slit and extend in a direction away from the surface of the metal substrate 10 with the at least one first hole 20.

According to some embodiments, the inner surface of the at least one first hole 20 is uneven.

In some embodiments illustrated in FIG. 5, the plurality of second holes 30 and the inner surface of the plurality of second holes 30 together have a spongy structure, that is, the spongy structure is formed by the plurality of second holes 30 and the inner surface of the plurality of second holes 30. Each of the plurality of second holes 30 may have a semi-open shape, and directions of openings of the plurality of second holes 30 are different and face in various directions, so as to increase a pull strength between the metal product 100 and a material product 210 formed in the plurality of second holes 30, thereby enhancing a bonding strength between the metal product 100 and the material product 210.

According to some embodiments, the plurality of second holes 30 may be in communication with each other from the inside of the metal substrate 10. When the material product 210 is formed in the plurality of second holes 30 in communication with each other, a portion of the material product 210 may be embedded in the metal substrate 10. The material product 210 and the inner surface of the plurality of second holes 30 in communication with each other are interlocked with each other, so as to further enhance the bonding strength between the metal product 100 and the material product 210 by an interaction between the metal product 100 and the material product 210, thereby preventing the material product 210 from falling off.

According to some embodiments, the directions of the openings of the plurality of second holes 30 are different from each other. The directions of the openings of the plurality of second holes 30 along the inner surface of the at least one first hole 20 are different.

According to some embodiments, shapes of the plurality of second holes 30 are different from each other. The shapes of the plurality of second holes 30 are different from each other in space.

In some embodiments illustrated in FIG. 5, a diameter of each of the plurality of second holes 30 is defined as $R_2$. The range of the diameter $R_2$ satisfies 0.1 µm≤$R_2$≤5 µm, that is, each of the plurality of second holes 30 is approximately a submicron-sized to micron-sized hole. The submicron-sized is defined as an order of magnitude of $10^2$ nm to 1 µm. According to some embodiments, a lower limit of the diameter $R_2$ is one of 0.2 µm, 0.8 µm, 1.3 µm, 1.6 µm, 2.6 µm, 3.2 µm, 3.8 µm, and 4.5 µm. An upper limit of the diameter $R_2$ is one of 0.5 µm, 1.8 µm, 2.2 µm, 2.7 µm, 3.5 µm, 3.9 µm, 4.3 µm, and 4.8 µm. The lower limit of the diameter $R_2$ is less than or equal to the upper limit of the diameter $R_2$.

The at least one third hole 40 may be formed in the portion of the surface of the metal substrate 10 without the at least one first hole 20 and without the at least one second hole 30. The at least one third hole 40 may be formed in the portion of the inner surface defining the at least one first hole 20 without the at least one second hole 30, and the at least one third hole 40 may also be formed in the inner surface defining the at least one second hole 30 (shown in FIG. 5 and FIG. 6).

Figure 6:
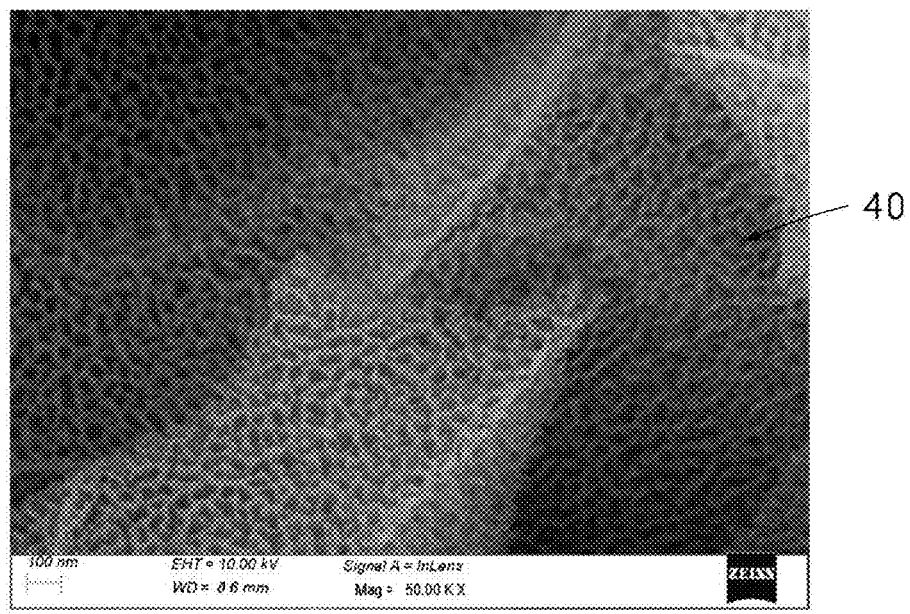
FIG. 6 is a SEM image of a metal product, in accordance with some embodiments of the present disclosure.

In some embodiments illustrated in FIG. 6, a plurality of third holes 40 are formed in the inner surface defining the plurality of second holes 30. Since the directions of the openings of the plurality of second holes 30 are different, and the shapes of the plurality of second holes 30 are irregular, directions of openings of the plurality of third holes 40 are different and face in various directions. According to some embodiments, the plurality of third holes 40 may be formed in at least one of the portion of the surface of the metal substrate 10 without the at least one first hole 20 and without the at least one second hole 30 and the portion of the inner surface defining the at least one first hole 20 without the at least one second hole 30. Positions of the plurality of third holes 40 are different, so that the directions of openings of the plurality of third holes 40 are different. The arrangement of the plurality of third holes 40 may greatly increase a contact area between the metal product 100 and the material product 210, thereby enhancing the bonding strength between the metal product 100 and the material product 210. The arrangement of the at least one first hole 20 and the at least one second hole 30 may also increase the contact area between the metal product 100 and the material product 210.

According to some embodiments, the directions of openings of the plurality of third holes 40 are different from each other. Since the positions of the plurality of third holes 40 are different, along different directions, the directions of openings of the plurality of third holes 40 are different.

In some embodiments illustrated in FIG. 6, a diameter of each of the plurality of third holes 40 is defined as $R_3$. The range of the diameter $R_3$ satisfies $30 \text{ nm} \leq R_3 \leq 70 \text{ nm}$, that is, each of the plurality of third holes 40 is approximately a nano-sized hole. According to some embodiments, a lower limit of the diameter $R_3$ is one of 32 nm, 36 nm, 41 nm, 46 nm, 52 nm, 56 nm, and 68 nm. An upper limit of the diameter $R_3$ is one of 35 nm, 39 nm, 43 nm, 49 nm, 53 nm, 57 nm, and 69 nm. The lower limit of the diameter $R_3$ is less than or equal to the upper limit of the diameter $R_3$.

A material of the inner surface defining the at least one third hole 40 includes oxide. Since the oxide is formed by oxidizing the metal substrate 10, the type of the oxide is related to a material of the metal substrate 10. According to some embodiments, the oxide may be aluminum oxide.

Figure 7:
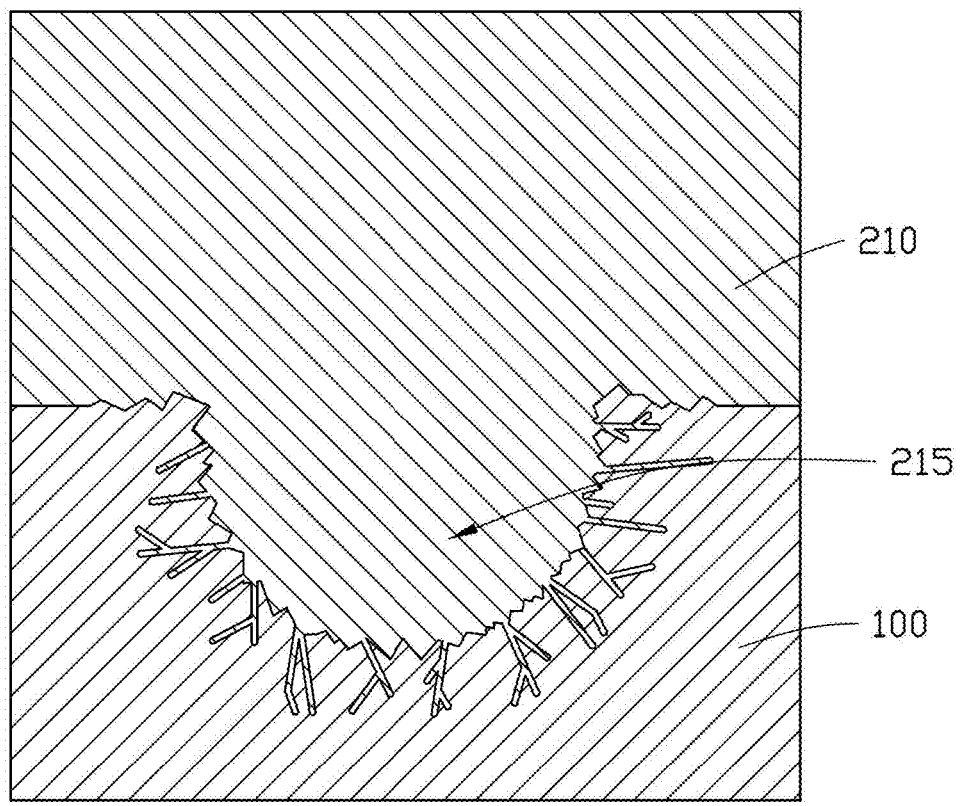
FIG. 7 is a simplified cross-sectional side view of a metal composite, in accordance with some embodiments of the present disclosure.
Figure 8:
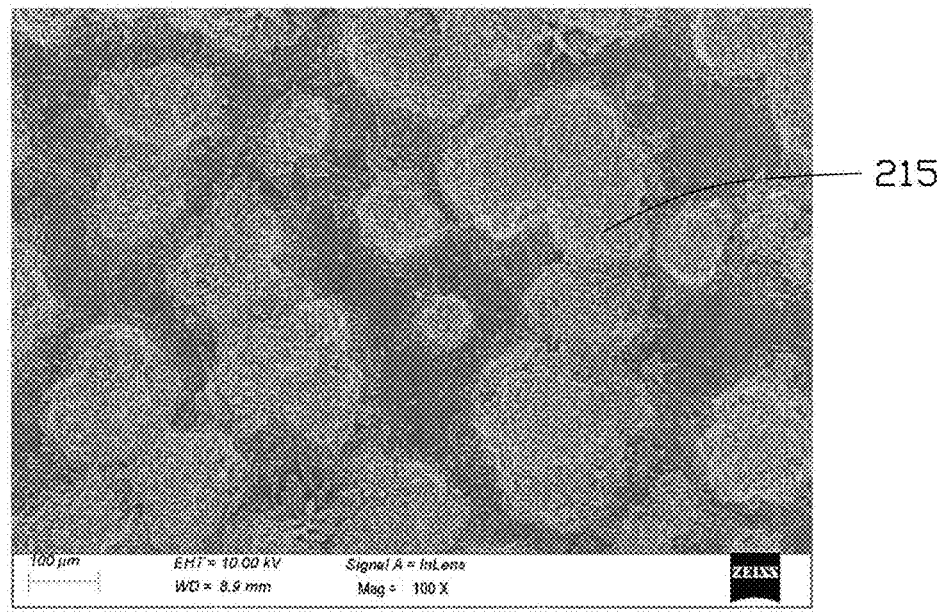
FIG. 8 is a SEM image of an exposed combining portion of a material product after removing a metal product from a metal composite, in accordance with some embodiments of the present disclosure.
Figure 9:
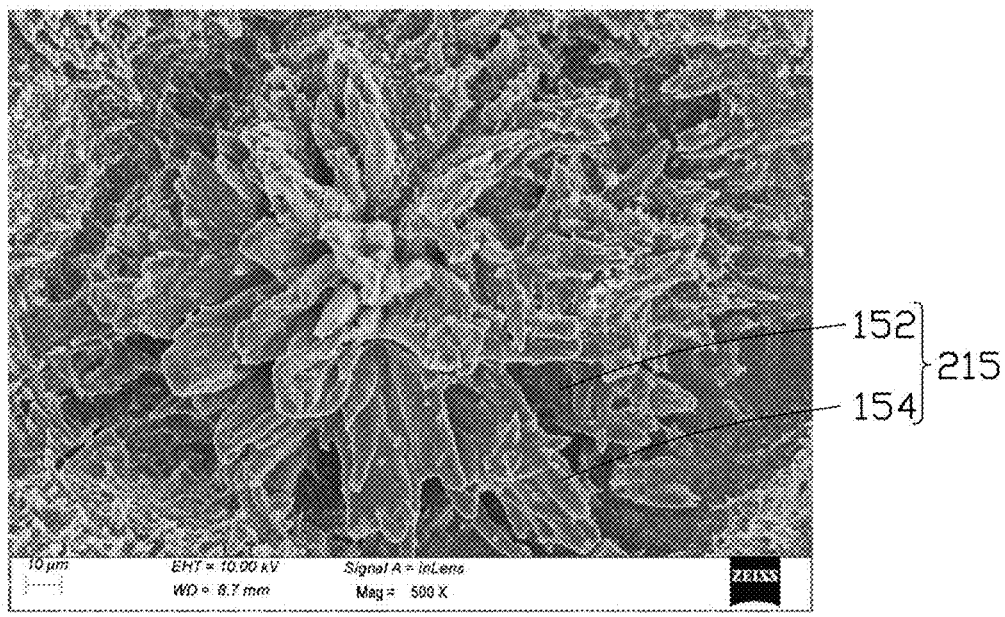
FIG. 9 is a SEM image of an exposed combining portion of a material product after removing a metal product from a metal composite, in accordance with some embodiments of the present disclosure.
Figure 10:
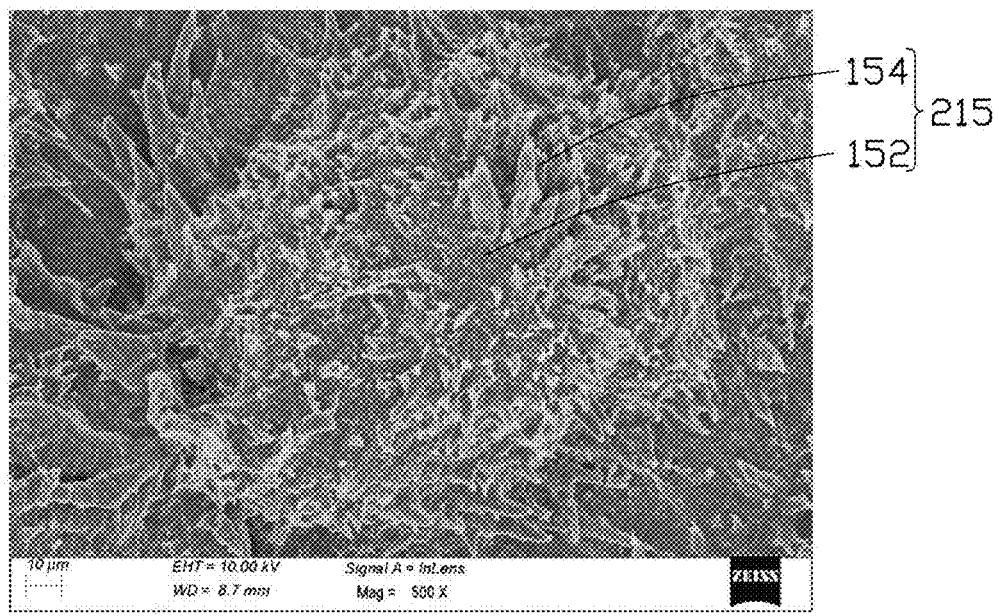
FIG. 10 is a SEM image of an exposed combining portion of a material product after removing a metal product from a metal composite, in accordance with some embodiments of the present disclosure.
Figure 11:
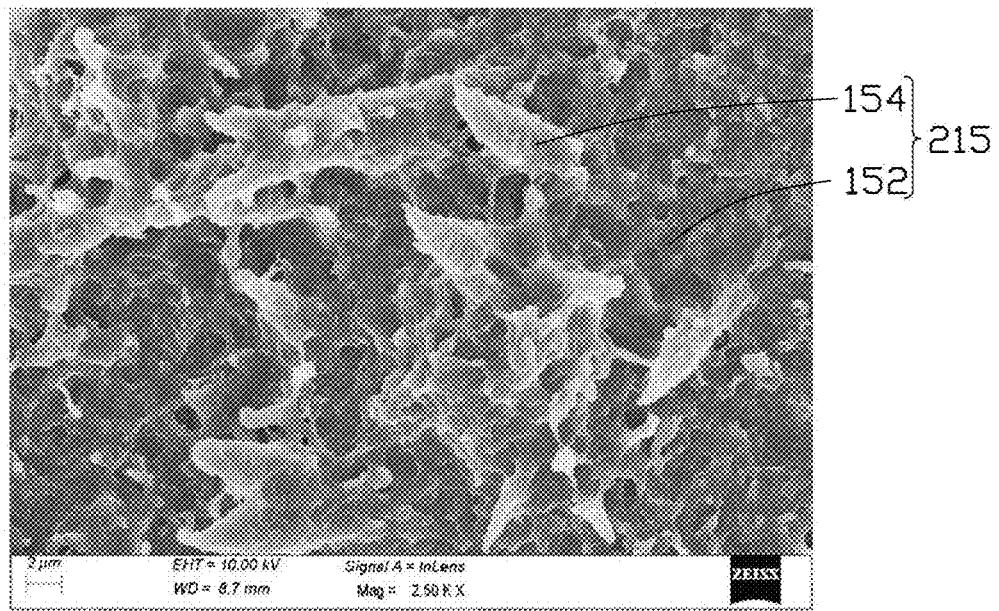
FIG. 11 is a SEM image of an exposed combining portion of a material product after removing a metal product from a metal composite, in accordance with some embodiments of the present disclosure.
Figure 12:
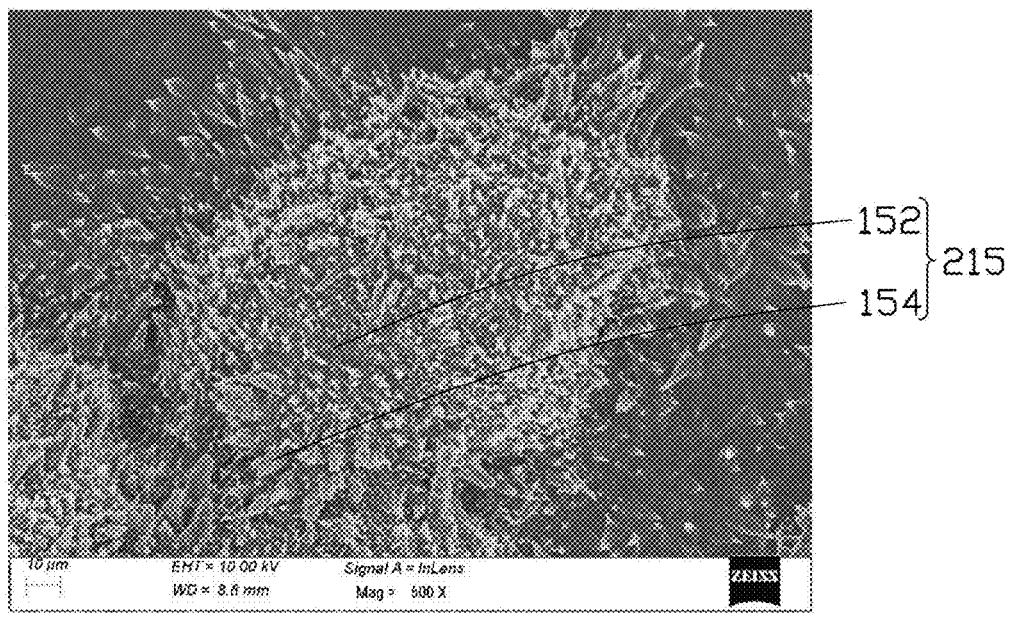
FIG. 12 is a SEM image of an exposed combining portion of a material product after removing a metal product from a metal composite, in accordance with some embodiments of the present disclosure.
Figure 13:
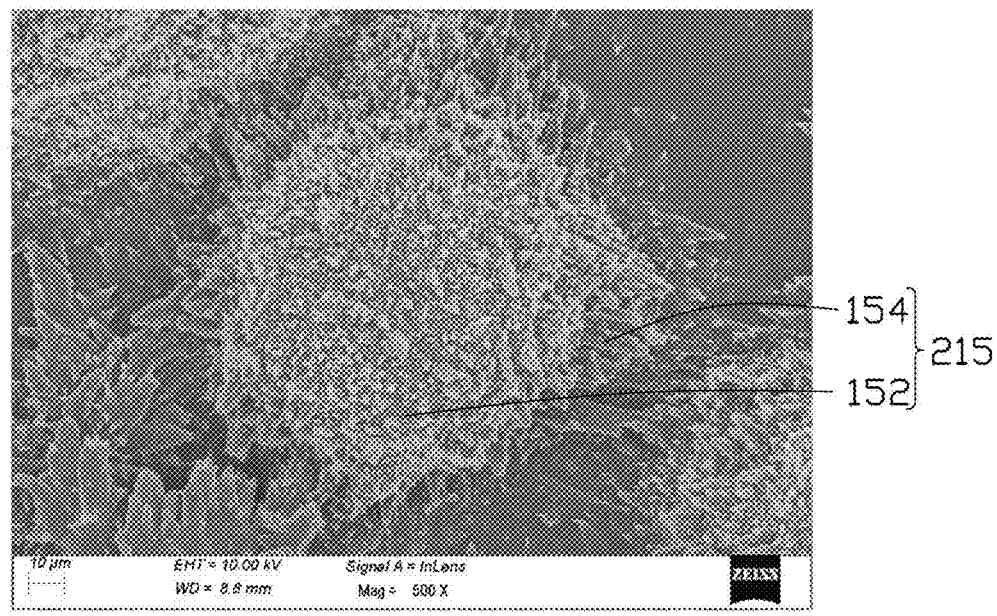
FIG. 13 is a SEM image of an exposed combining portion of a material product after removing a metal product from a metal composite, in accordance with some embodiments of the present disclosure.
Figure 14:
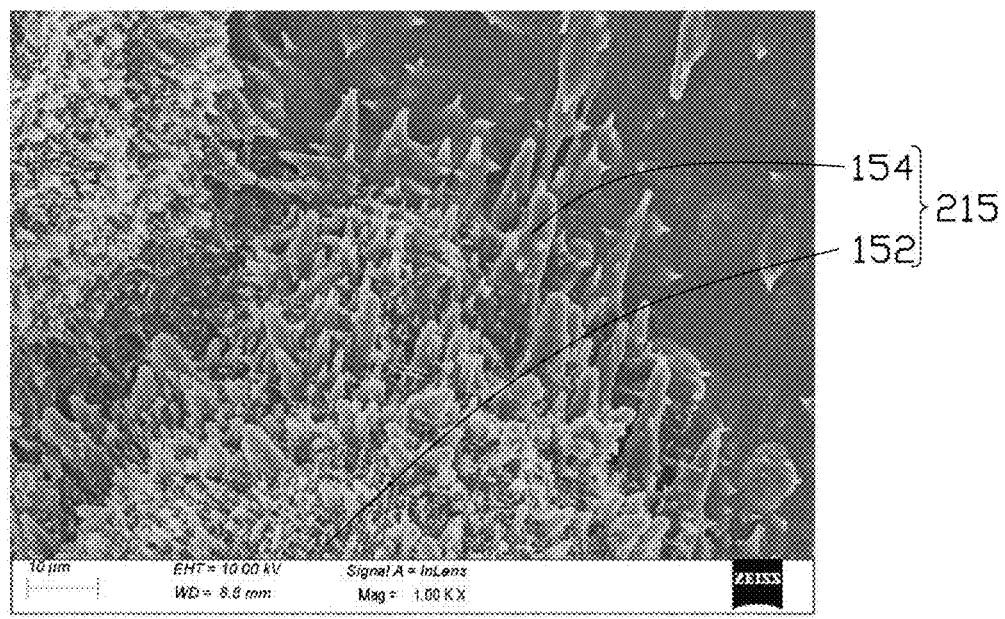
FIG. 14 is a SEM image of an exposed combining portion of a material product after removing a metal product from a metal composite, in accordance with some embodiments of the present disclosure.
Figure 15:
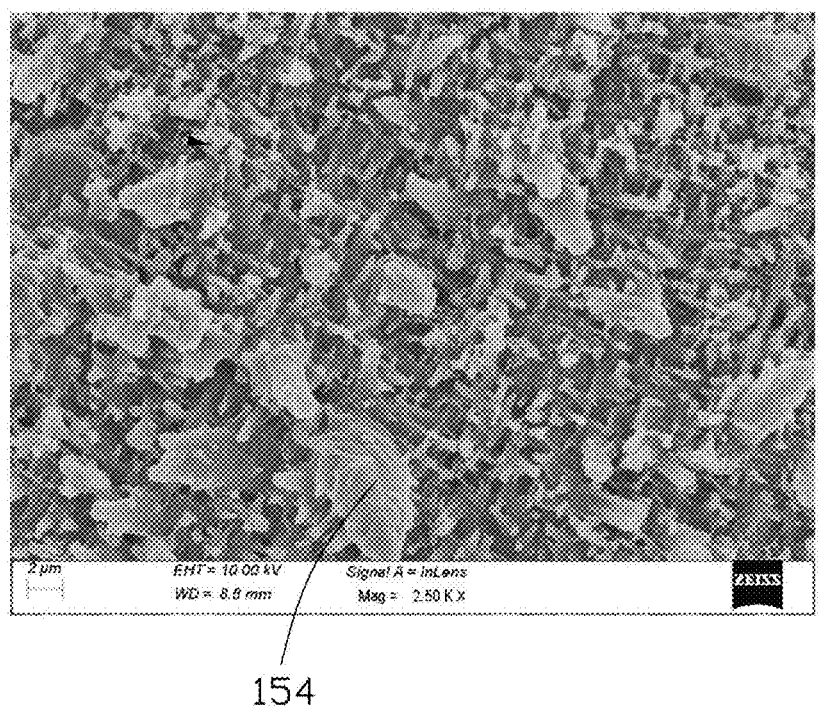
FIG. 15 is a SEM image of an exposed combining portion of a material product after removing a metal product from a metal composite, in accordance with some embodiments of the present disclosure.

In some embodiments illustrated in FIG. 7, a metal composite 200 is provided. The metal composite 200 includes the metal product 100 and the material product 210. The material product 210 is formed on the metal product 100.

The material product 210 includes a combining portion 215. At least part of the combining portion 215 is filled in at least one of the at least one first hole 20, the at least one second hole 30, and the at least one third hole 40, so that the material product 210 and the metal product 100 are composited.

The material product 210 may be made of a material selected form a group consisting of plastic, metal, ceramic, glass, oxide, and any combination thereof.

In some embodiments illustrated in FIGS. 8 to 15, the metal product 100 of the metal composite 200 is removed to obtain the material product 210.

In some embodiments illustrated in FIGS. 8 to 11, the combining portion 215 includes at least one first part, at least one second part diverging from the at least one first part, and at least one third part diverging from the at least one first part and the at least one second part. The at least one first part is embedded into the at least one first hole 20. The at least one second part is embedded into the at least one second hole 30. The at least one third part is embedded into the at least one third hole 40. According to some embodiments, the combining portion 215 has a sea urchin-like structure, and the at least one second part and the at least one third part are similar to spiny structures of the shell of a sea urchin. It should be noted that the sea urchin-like structure does not mean the combining portion 215 has the same structure as a real sea urchin. For example, each of the at least one second part and the at least one third part does not have a regular linear shape like spines of the shell of the sea urchin, but is an irregular columnar structure.

According to some embodiments, the combining portion 215 has a sea cucumber-like structure, that is, the combining portion 215 includes an ellipsoid-like structure similar to a body of a sea cucumber, a plurality of protrusions on the ellipsoid-like structure resembling spines on the body of the sea cucumber, and a plurality of spines on the plurality of protrusions resembling spinules on the body of the sea cucumber. The metal product 100 includes a triple (or three-layer) pore structure, which results in a complex structure of the combining portion 215 and contributes to the bonding strength between the material product 210 and the metal product 100. It should be noted that the sea cucumber-like structure does not mean the combining portion 215 has the same structure as a real sea cucumber. For example, sea cucumbers are generally long cylindrical, but the combining portion 215 has an ellipsoid-like structure.

According to some embodiments, the combining portion 215 has a durian-like structure, that is, the combining portion 215 includes an ellipsoid-like structure similar to an outer shell of a durian, a plurality of protrusions on the ellipsoid-like structure similar to thorns on the outer shell of the durian, and a plurality of small thorns on each of the plurality of protrusions on the ellipsoid-like structure. It should be noted that the durian-like structure does not mean the combining portion 215 has the same structure as a real durian. For example, the small thorns on each of the plurality of protrusions do not exist on the thorns of the real durian's outer shell.

In some embodiments illustrated in FIGS. 11 to 15, the combining portion 215 includes a main body 152 and at least one of branch structure 154 (including a plurality of branches) diverging from the main body 152. Shapes of a plurality of branch structures 154 are different from each other. When the material product 210 is combined with the metal product 100, the main body 152 is located in the first hole 20, the at least one of branch structure 154 is located in the second hole 30, and an uneven surface of the at least one of branch structure 154 is formed by shaping the material product 210 in the third hole 40.

According to some embodiments, a plurality of branch structures 154 may be connected to each other, that is, the branches of different branch structures 154 may be connected to each other. The branch structures 154 connected to each other may be formed by the second holes 30 connected to each other.

According to some embodiments, the combining portion 215 may include the sea urchin-like structure, and may further include the main body 152 and the at least one branch structure 154 diverging from the main body 152.

In the metal product 100, a triple (or three-layer) composite structure of the at least one micron-sized first hole 20, the at least one submicron-sized to micron-sized second hole 30, and the at least one nano-sized third hole 40 is formed in the metal substrate 10. When the metal product 100 is combined with the material product 210, the combining portion 215 of the material product 210 is embedded in the triple (or three-layer) composite structure, thereby enhancing the bonding strength between the metal product 100 and the material product 210. At the same time, since the triple (or three-layer) composite structure includes a complicated pore structure, it is more difficult for external gases and liquids to pass through the triple (or three-layer) composite structure, thereby improving an air tightness and liquid tightness of the metal composite 200.

According to some embodiments, a method for manufacturing the metal product 100 is provided. In some embodiments illustrated in FIG. 16, a flowchart of a method for manufacturing the metal product 100 includes following steps.

Figure 17:
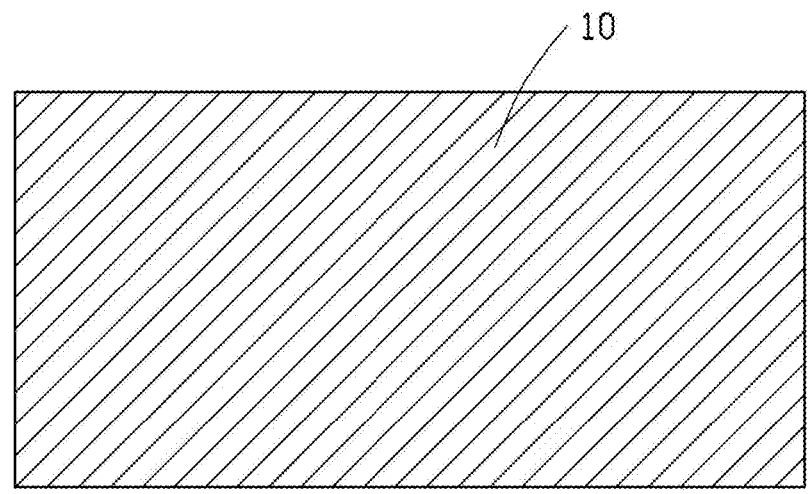
FIG. 17 is a simplified cross-sectional side view of a metal substrate, in accordance with some embodiments of the present disclosure.
Figure 18:
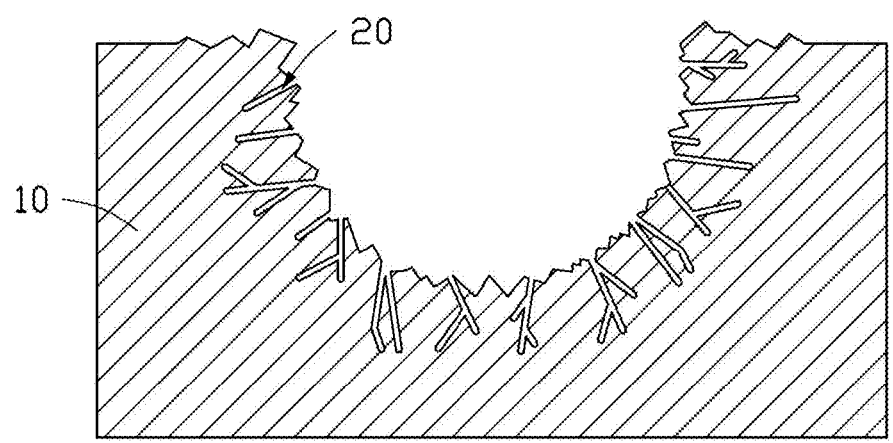
FIG. 18 is a simplified cross-sectional side view showing at least one first hole and at least one second hole in the metal substrate of FIG. 17, in accordance with some embodiments of the present disclosure.

Step X11, in some embodiments illustrated in FIGS. 17 and 18, putting a metal substrate 10 into a first electrolyte as an anode, and putting a first cathode conductor in the first electrolyte as a cathode; then applying electricity on the metal substrate 10 and the first cathode conductor to perform an electrolysis treatment on the metal substrate 10 to electrolyze the metal substrate 10, thereby forming at least one first hole 20 and at least one second hole 30 in the metal substrate 10. The first electrolyte includes persulfate.

Step X12, in some embodiments illustrated in FIG. 1, putting the metal substrate 10 with the at least one first hole 20 and the at least one second hole 30 into a second electrolyte as an anode, and putting a second cathode conductor in the second electrolyte as a cathode; then applying electricity on the metal substrate 10 and the second cathode conductor to perform an anodic oxidation treatment, thereby forming at least one third hole 40 in at least one of a surface of the metal substrate 10 without the at least one first hole 20 and without the at least one second hole 30, an inner surface defining the at least one first hole 20, and an inner surface defining the at least one second hole 30.

In the step X11, the persulfate may be selected from a group consisting of potassium persulfate, sodium persulfate, ammonium persulfate, and any combination thereof.

A concentration of the persulfate in the first electrolyte is defined as C. The range of the concentration C satisfies $10 \text{ g/L} \leq C \leq 200 \text{ g/L}$. According to some embodiments, a lower limit of the concentration C is one of 12 g/L, 35 g/L, 58 g/L, 82 g/L, 125 g/L, 145 g/L, 168 g/L, and 188 g/L. An upper limit of the concentration C is one of 22 g/L, 42 g/L, 68 g/L, 85 g/L, 128 g/L, 149 g/L, 172 g/L, and 198 g/L. The lower limit of the concentration C is less than or equal to the upper limit of the concentration C.

According to some embodiments, the first electrolyte further includes a pH conditioning agent to adjust a pH value of the first electrolyte. The pH conditioning agent may be selected from a group consisting of sulfuric acid, oxalic acid, organic acid, and any combination thereof. The organic acid does not contain nitrogen and phosphorus, such as citric acid. That is, the above-mentioned pH conditioning agent can avoid an introduction of nitrogen and phosphorus-containing substances, which is beneficial to environmental protection.

A concentration of the pH conditioning agent in the first electrolyte is defined as C1. The range of the concentration C1 satisfies $10 \text{ g/L} \leq C1 \leq 100 \text{ g/L}$. According to some embodiments, a lower limit of the concentration C1 is one of 12 g/L, 25 g/L, 38 g/L, 52 g/L, 55 g/L, 65 g/L, 78 g/L, and 88 g/L. An upper limit of the concentration C1 is one of 22 g/L, 32 g/L, 48 g/L, 55 g/L, 68 g/L, 79 g/L, 82 g/L, and 98 g/L. The lower limit of the concentration C1 is less than or equal to the upper limit of the concentration C1.

A temperature of the electrolysis treatment is defined as T. The range of the temperature T satisfies $20°\text{C.} \leq T \leq 50°\text{C.}$ According to some embodiments, a lower limit of the temperature T is one of 22° C., 25° C., 30° C., 33° C., 39° C., 42° C., 46° C., and 48° C. An upper limit of the temperature T is one of 23° C., 27° C., 32° C., 35° C., 40° C., 43° C., 47° C., and 49° C. The lower limit of the temperature T is less than or equal to the upper limit of the temperature T.

A time of the electrolysis treatment is defined as t. The range of the time t satisfies $5 \text{ min} \leq t \leq 50 \text{ min}$. According to some embodiments, a lower limit of the time t is one of 7 min, 15 min, 23 min, 30 min, 35 min, 39 min, 43 min, and 47 min. An upper limit of the time t is one of 8 min, 16 min, 24 min, 31 min, 37 min, 41 min, 45 min, and 48 min. The lower limit of the time t is less than or equal to the upper limit of the time t.

In the process of applying electricity to the anode and the cathode, the metal substrate is energized, so that a part of the surface of the metal substrate is passivated by the first electrolyte including persulfate, the current is concentrated on an unpassivated area of the surface of the metal substrate. An equivalent resistance of the unpassivated area is less than an equivalent resistance of the passivated part, and an electrolytically etched area is located in an area with weak equivalent resistance (that is, the unpassivated area), so that the unpassivated area is electrolytically etched to form the at least one first hole 20 and the at least one second hole 30.

In the step X12, the second electrolyte may include an acid selected from a group consisting of oxalic acid, sulfuric acid, phosphoric acid, and any combination thereof. During the anodic oxidation treatment, a part of a material of the inner surface defining the at least one first hole 20, a part of a material of the inner surface defining the at least one second hole 30, and a part of a material of the surface of the metal substrate 10 react to form the plurality of third holes 40, and the above parts of the materials are oxidized to form oxides located on the inner surfaces defining the plurality of third holes 40.

Figure 19:
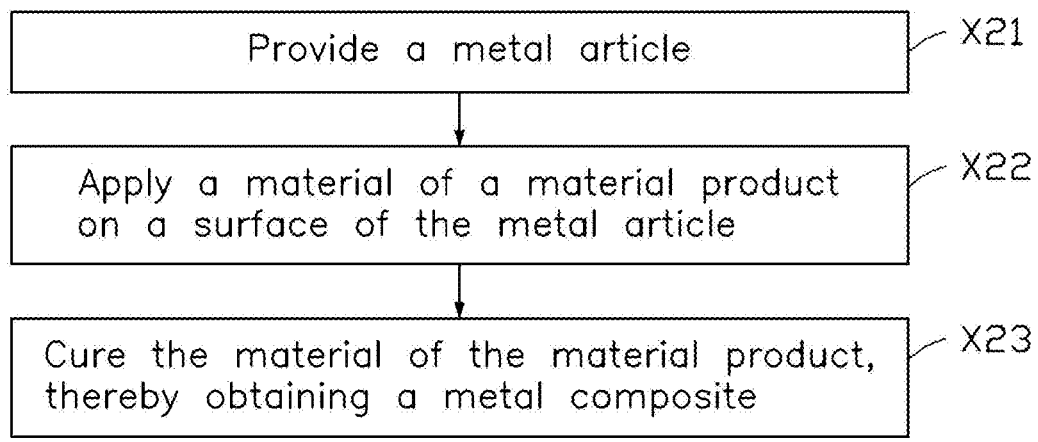
FIG. 19 is a flowchart of a method for manufacturing a metal composite, in accordance with some embodiments of the present disclosure.

According to some embodiments, a method for manufacturing the metal composite 200 is provided. In some embodiments illustrated in FIG. 19, a flowchart of a method for manufacturing the metal composite 200 includes following steps.

Step X21, providing a metal product 100.

Step X22, applying a material of a material product 210 on a surface of the metal product 100.

Step X23, curing the material of the material product 210, thereby obtaining a metal composite 200.

In step X21, the metal product 100 is manufactured by the above method for manufacturing the metal product 100.

In step X22, the material of the material product 210 may be selected form a group consisting of plastic, metal, ceramic, glass, oxide, and any combination thereof.

In step X23, the material product 210 is applied to the surface of the metal substrate 10, and at least a part of the material product 210 enters the at least one first hole 20, the at least one second hole 30, and the at least one third hole 40. After the material product 210 is cured, the part of the material product 210 located in the at least one first hole 20, the at least one second hole 30, and the at least one third hole 40 forms a combining portion 215 to combine the material product 210 and metal product 100, thus the metal composite 200 is obtained.

The material of the material product 210 may be processed by methods which are set according to properties or a status of the material of the material product 210.

For example, the material of the material product 210 is metal and in a particle state, the material of the material product 210 may be processed by a laser melting method to form the material product 210.

For example, the material of the material product 210 is plastic, when the material is in a liquid/solution state, the material may be processed by evaporating a solvent of the liquid/solution to form the material product 210. When the material is in a particle state, the material may be processed by a heating to melt the material product 210. When the material is in a molten state, the material may be molded to form the material product 210. When the material is in a gas state, the material may be formed by a gas in-situ polymerization method.

For example, the material of the material product 210 is a ceramic and is in a particle state, the material may be processed by a sintering method or a bonding method with a bonding agent to form the material product 210.

For example, the material of the material product 210 is glass, when the material is in a particle state, the material may be processed by a heat melting method to form the material product 210; when the material is in a molten state, the material may be processed by a cooling method to form the material product 210.

The materials and processing methods of the material of the material product 210 are not limited to the above examples.

According to some embodiments, the metal product 100 is put in a heated mold, a molten plastic is injected on the surface of the metal product 100 and enters into the at least one first hole 20, the at least one second hole 30, and the at least one third hole 40, and the metal composite 200 is obtained by injection molding.

In the method for manufacturing the metal product 100 and the method for manufacturing the metal composite 200, first, the at least one first hole 20 and the at least one second hole 30 is formed by electrolysis using the first electrolyte including persulfate. The first electrolyte does not include acidic substances with nitrogen and phosphorus, so that the at least one first hole 20 can be formed in the surface of the metal substrate 10, and the at least one second hole 30 can also be formed under an action of persulfate at the same time. Then, the at least one third hole 40 is formed by anodic oxidation in the second electrolyte, thereby obtaining the metal product 100. The first electrolyte and the second electrolyte do not include halogen-containing substances such as chlorine or fluorine, thereby preventing the residual electrolyte from further corroding the metal substrate. Since the material product 210 is embedded in the at least one first hole 20, the at least one second hole 30, and the at least one third hole 40, the bonding strength between the metal product 100 and the material product 210 is enhanced. At the same time, since the triple (or three-layer) composite structure includes a complicated pore structure, it is more difficult for external gases and liquids to pass through the triple (or three-layer) composite structure, thereby improving an air tightness and liquid tightness of the metal composite 200.

Figure 20:
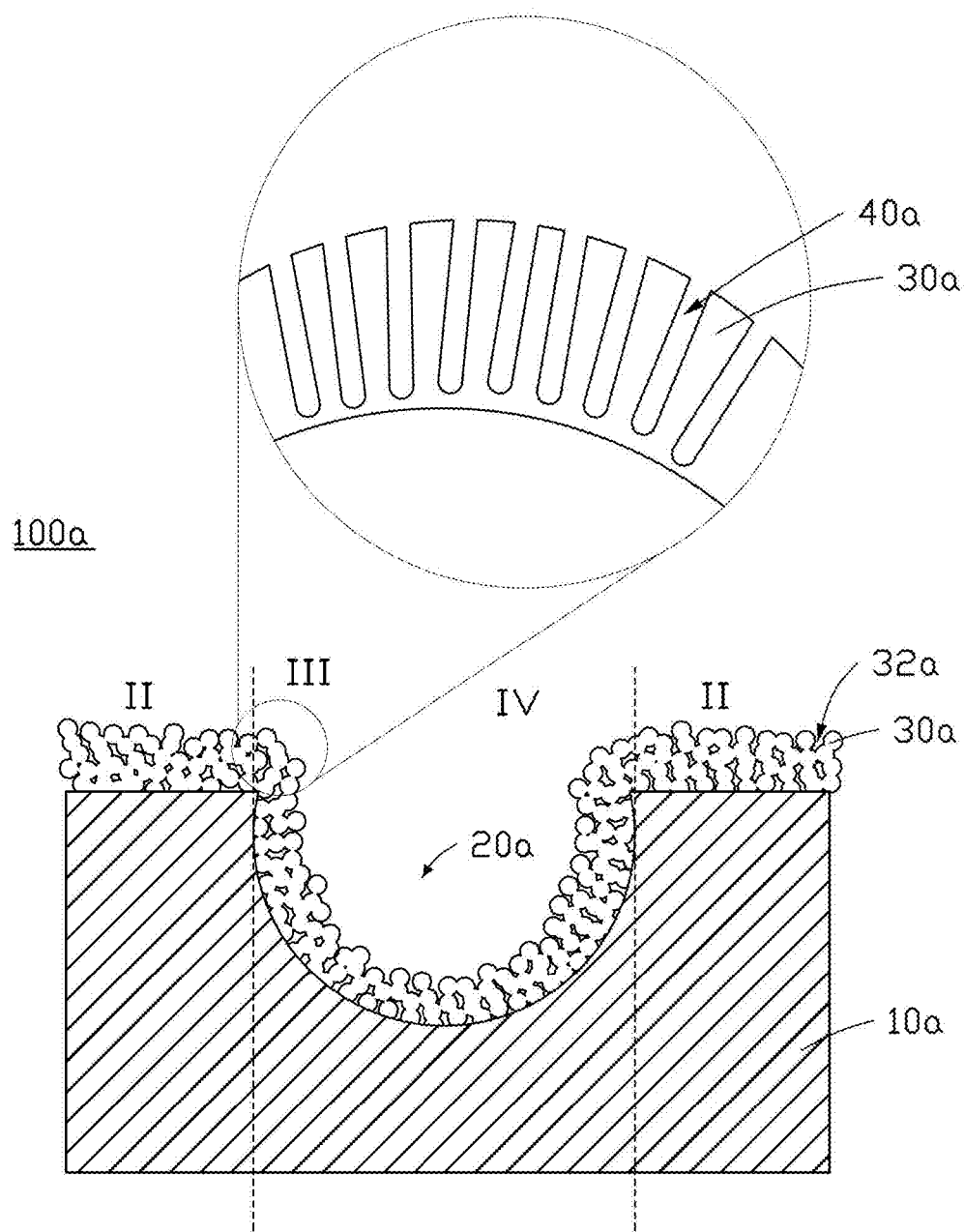
FIG. 20 is a simplified cross-sectional side view of a metal product, and an enlarged view in area III of the metal product, in accordance with some embodiments of the present disclosure.

In some embodiments illustrated in FIG. 20, a metal product 100a is provided. The metal product 100a includes a metal substrate 10a, at least one first hole 20a, at least one protrusion 30a, and at least one third hole 40a. The at least one first hole 20a is formed in a surface of the metal substrate 10a. The at least one protrusion 30a is formed in at least one of a portion of the surface of the metal substrate 10a without the at least one first hole 20a and an inner surface defining the at least one first hole 20a. The at least one protrusion 30a surrounds to form the at least one second hole 32a. The at least one third hole 40a is formed in at least one of a surface of the at least one protrusion 30a and a surface of the metal substrate 10a exposed from the at least one protrusion 30a.

The metal substrate 10a may be made of a material selected from a group consisting of aluminum, aluminum alloy, titanium, titanium alloy, and any combination thereof.

According to some embodiments, the at least one first hole 20a is formed in one surface of the metal substrate 10a. According to some embodiments, a plurality of first holes 20a may be formed in a plurality of surfaces of the metal substrate 10a.

Figure 21:
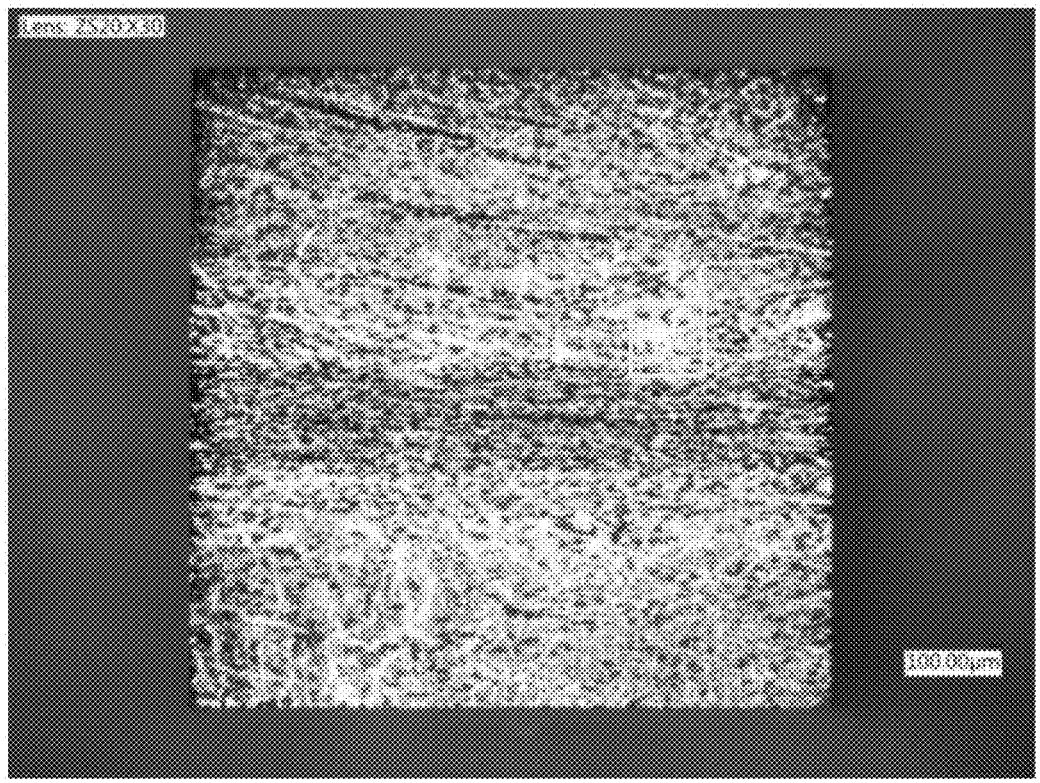
FIG. 21 is an OM image of a metal product, in accordance with some embodiments of the present disclosure.

In some embodiments illustrated in FIG. 21, a diameter of each of the at least one first hole 20a is defined as $R_1$. The range of the diameter $R_1$ satisfies 50 μm<$R_1$≤150 μm, that is, each of the at least one first hole 20a is approximately a micron-sized hole. According to some embodiments, a lower limit of the diameter $R_1$ is one of 50 μm, 62 μm, 75 μm, 93 μm, 110 μm, 124 μm, 137 μm, and 148 μm. An upper limit of the diameter $R_1$ is one of 55 μm, 68 μm, 76 μm, 97 μm, 113 μm, 129 μm, 139 μm, and 150 μm. The lower limit of the diameter $R_1$ is less than or equal to the upper limit of the diameter $R_1$.

The at least one protrusion 30a is located on at least one of the portion of the surface of the metal substrate 10a without the at least one first hole 20a and the inner surface defining the at least one first hole 20a. That is, the at least one protrusion 30a may be located on a portion of the surface of the metal substrate 10a with the at least one first hole 20a (shown in the area IV of FIG. 20), and may also be located on the portion of the surface of the metal substrate 10a without the at least one first hole 20a (shown in the area II of FIG. 20). A material of the at least one protrusion 30a may be selected from a group consisting of aluminum, titanium, chromium, indium, and any combination thereof.

Figure 22:
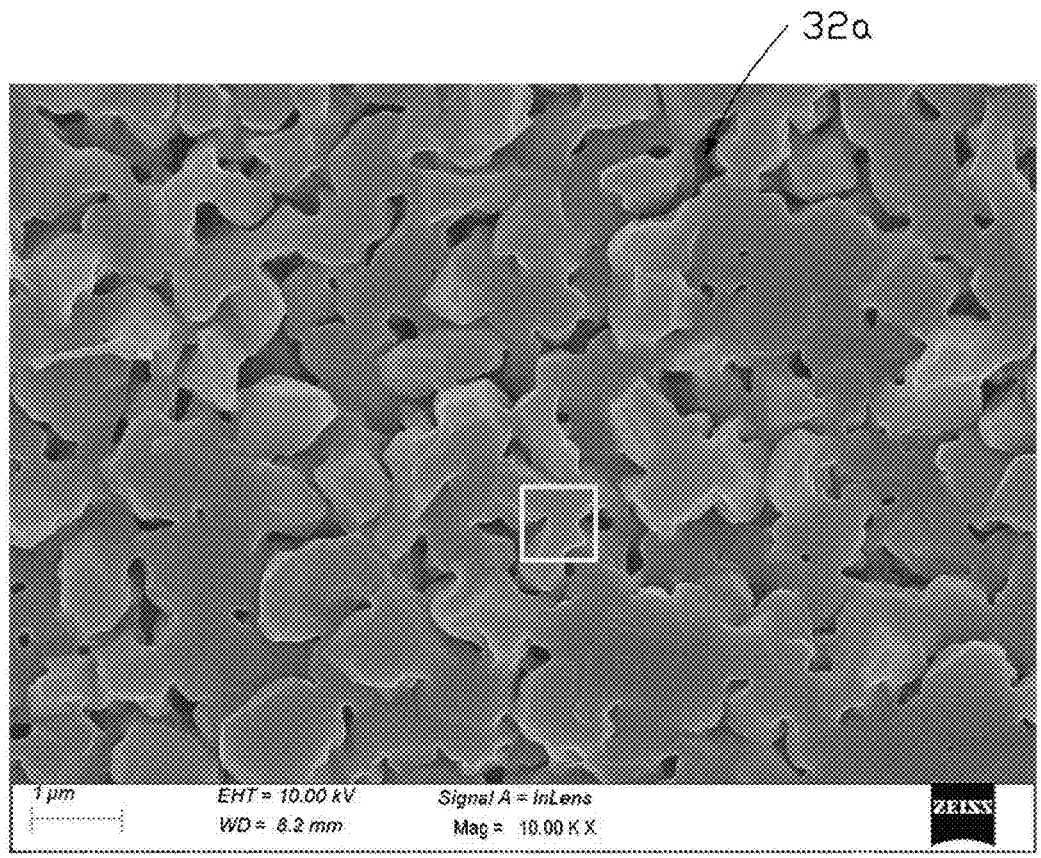
FIG. 22 is a SEM image of a metal product, in accordance with some embodiments of the present disclosure.

In some embodiments illustrated in FIG. 22, the number of the at least one protrusion 30a is multiple, the at least one second hole 32a may be formed by surrounding a plurality of protrusions 30a, or may be formed by one irregularly shaped protrusion 30a. A shape of each of the at least one second hole 32a depends on a distribution state of the plurality of protrusions 30a. According to some embodiments, the shape of each of the at least one second hole 32a is irregular. A diameter of each of the at least one second hole 32a is defined as $R_2$. The range of the diameter $R_2$ satisfies 0.1 μm≤$R_2$≤5 that is, each of the at least one second hole 32a is approximately a submicron-sized hole. The submicron-sized is defined as an order of magnitude of $10^2$ nm or an order of magnitude of $10^{-1}$ μm. According to some embodiments, a lower limit of the diameter $R_2$ is one of 115 nm, 132 nm, 156 nm, 180 nm, 205 nm, 246 nm, 268 nm, and 290 nm. An upper limit of the diameter $R_2$ is one of 125 nm, 145 nm, 168 nm, 180 nm, 226 nm, 253 nm, 278 nm, and 295 nm. The lower limit of the diameter $R_2$ is less than or equal to the upper limit of the diameter $R_2$.

Figure 23:
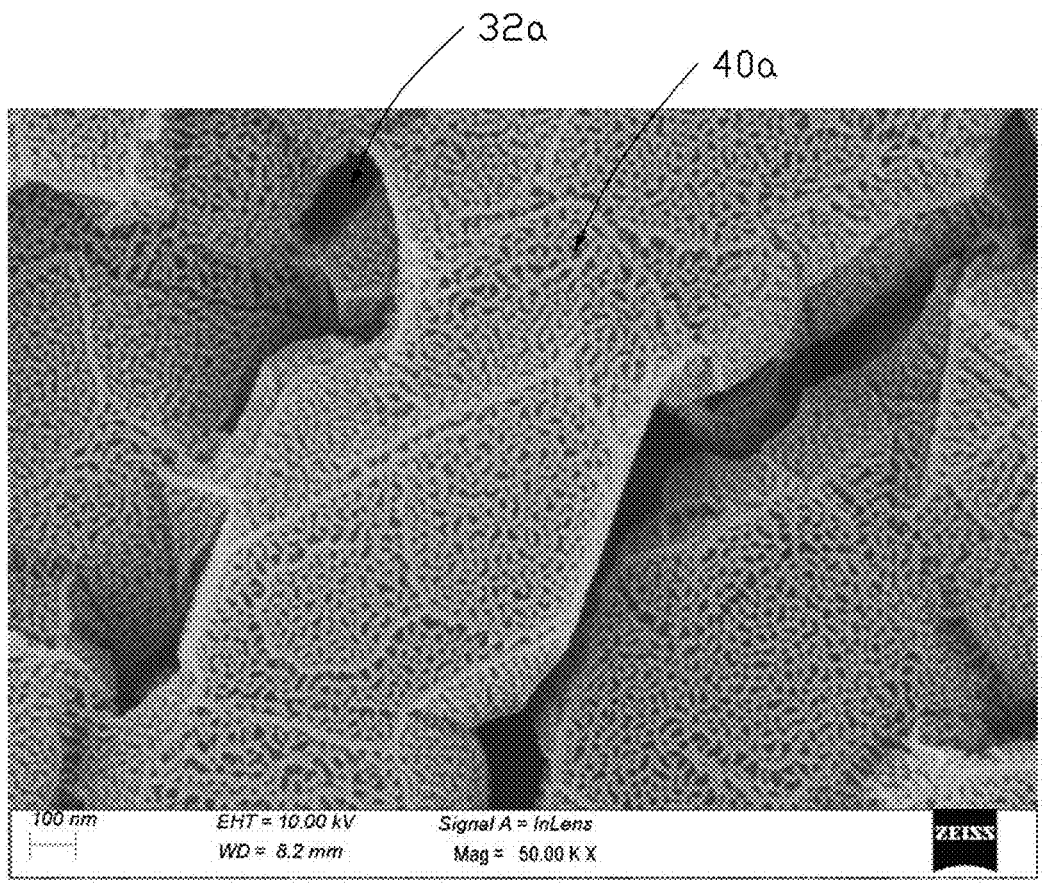
FIG. 23 is a SEM image of a metal product, in accordance with some embodiments of the present disclosure.

In some embodiments illustrated in FIG. 23, the at least one third hole 40a may be located in the surface of the at least one protrusion 30a (shown in the area III of FIG. 20), may be located in the surface of the metal substrate 10a exposed from the at least one protrusion 30a, or may be located in the inner surface defining the at least one hole 20a and exposed from the at least one protrusion 30a.

A diameter of each of the at least one third hole 40a is defined as $R_3$. The range of the diameter $R_3$ satisfies 20 nm<$R_3$≤50 nm, that is, each of the at least one third hole 40a is approximately a nano-sized hole. According to some embodiments, a lower limit of the diameter $R_3$ is one of 22 nm, 26 nm, 31 nm, 36 nm, 42 nm, 46 nm, and 48 nm. An upper limit of the diameter $R_3$ is one of 25 nm, 29 nm, 33 nm, 39 nm, 43 nm, 47 nm, and 49 nm. The lower limit of the diameter $R_3$ is less than or equal to the upper limit of the diameter $R_3$.

According to some embodiments, a material of the inner surface defining the at least one first hole 20a and exposed from the at least one protrusion 30a includes oxide, such as aluminum oxide or titanium oxide. The oxide of the at least one first hole 20a may be formed by the material of the metal substrate 10a during an anodic oxidation treatment.

According to some embodiments, a material of an inner surface defining the at least one third hole 40a includes oxides, such as aluminum oxides, titanium oxides, chromium oxides, or indium oxides. The oxide of the at least one third hole 40a may be formed by the material of the at least one protrusion 30a and the material of the metal substrate 10a during an anodic oxidation treatment. When the at least one third hole 40a is located in the surface of the at least one protrusion 30a, the oxide of the at least one third hole 40a is formed by the material of the at least one protrusion 30a during an anodic oxidation treatment. When the at least one third hole 40a is located in the surface of the metal substrate 10a exposed from the at least one protrusion 30a, the oxide of the at least one third hole 40a is formed by the material of the metal substrate 10a during an anodic oxidation treatment.

Figure 24:
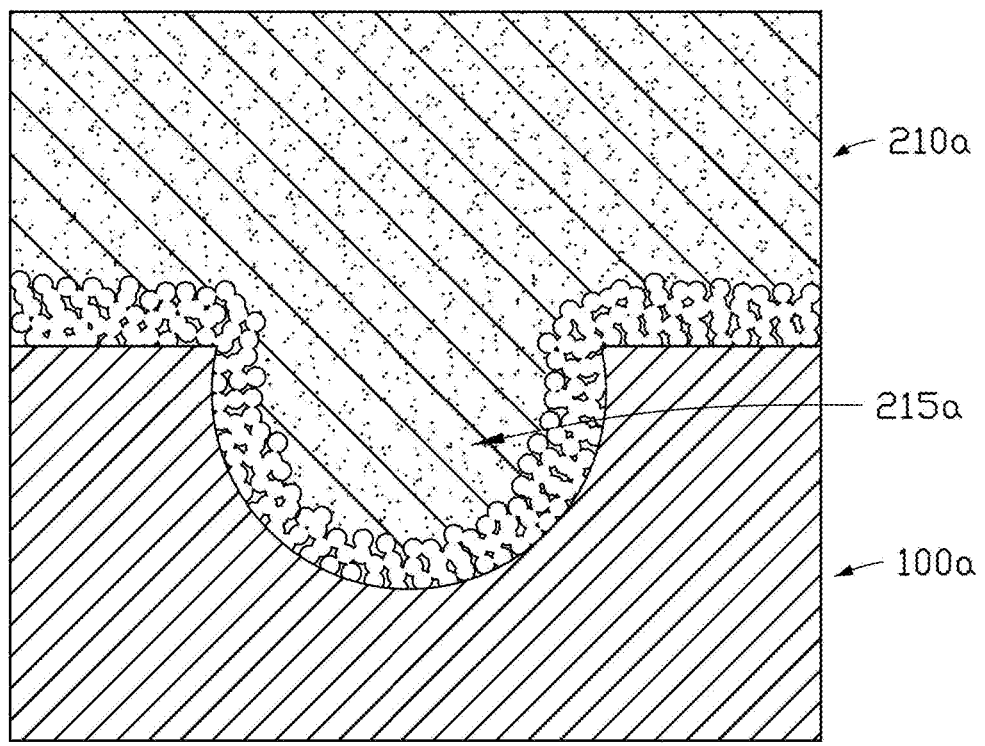
FIG. 24 is a simplified cross-sectional side view of a metal composite, in accordance with some embodiments of the present disclosure.

In some embodiments illustrated in FIG. 24, a metal composite 200a is provided. The metal composite 200a includes the metal product 100a and the material product 210a. The material product 210a is formed on the metal product 100a.

The material product 210a includes a combining portion 215a. At least part of the combining portion 215a is filled in at least one of the at least one micron-sized first hole 20a, the at least one submicron-sized second hole 32a, and the at least one nano-sized third hole 40a, so that the material product 210a and the metal product 100a are composited.

The material product 210a may be made of a material selected form a group consisting of plastic, metal, ceramic, glass, oxide, and any combination thereof.

In the metal product 100a, a triple (or three-layer) composite structure of the at least one micron-sized first hole 20a, the at least one submicron-sized second hole 32a, and the at least one nano-sized third hole 40a is formed in the metal substrate 10a. When the metal product 100a is combined with the material product 210a, the combining portion 215 of the material product 210a is embedded in the triple (or three-layer) composite structure, thereby enhancing the bonding strength between the metal product 100a and the material product 210a. At the same time, since the triple (or three-layer) composite structure includes a complicated pore structure, it is more difficult for external gases and liquids to pass through the triple (or three-layer) composite structure, thereby improving an air tightness and liquid tightness of the metal composite 200a.

In addition, when the metal product 100a is made of titanium or titanium alloy, the triple (or three-layer) composite structure also helps the metal product 100a to be effectively combined with other materials with poor fluidity, thereby solving a disadvantage that traditional titanium or titanium alloy products can only be combined with other materials with higher fluidity. Therefore, the application range of titanium or titanium alloy and their composites may be expanded.

Figure 25:
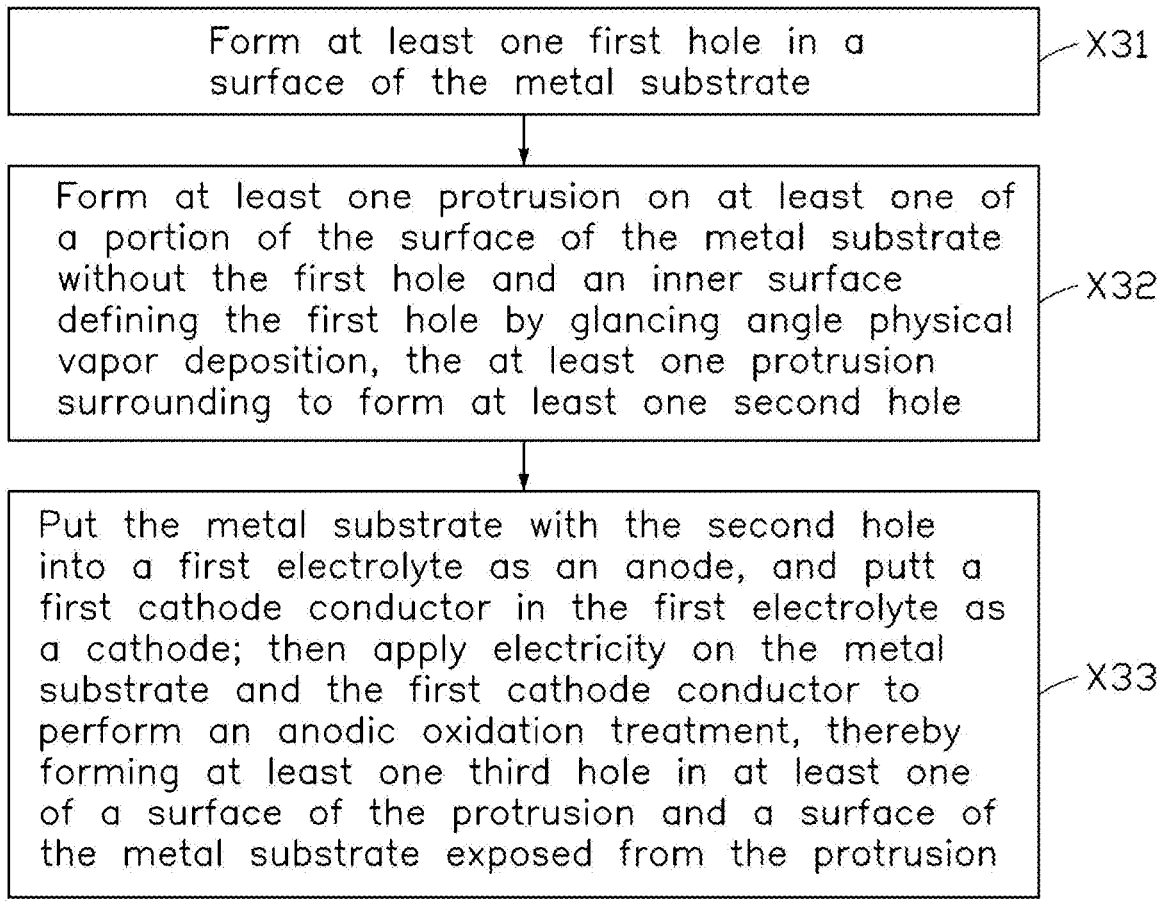
FIG. 25 is a flowchart of a method for manufacturing a metal product, in accordance with some embodiments of the present disclosure.

According to some embodiments, a method for manufacturing the metal product 100a is provided. In some embodiments illustrated in FIG. 25, a flowchart of a method for manufacturing the metal product 100a includes following steps.

Figure 26:
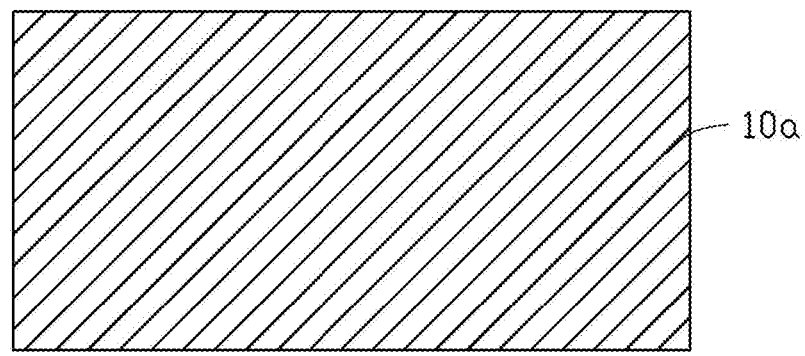
FIG. 26 is a simplified cross-sectional side view of a metal substrate, in accordance with some embodiments of the present disclosure.
Figure 27:
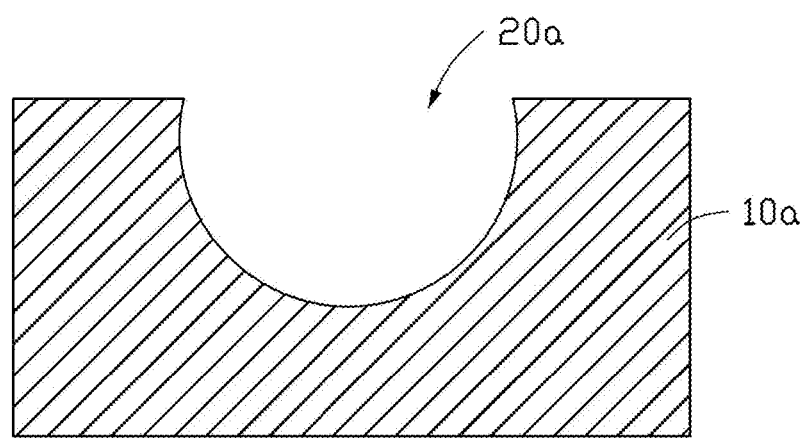
FIG. 27 is a simplified cross-sectional side view showing at least one first hole in the metal substrate of FIG. 26, in accordance with some embodiments of the present disclosure.

Step X31, in some embodiments illustrated in FIGS. 26 and 27, forming at least one first hole 20a in a surface of the metal substrate 10a.

Figure 28:
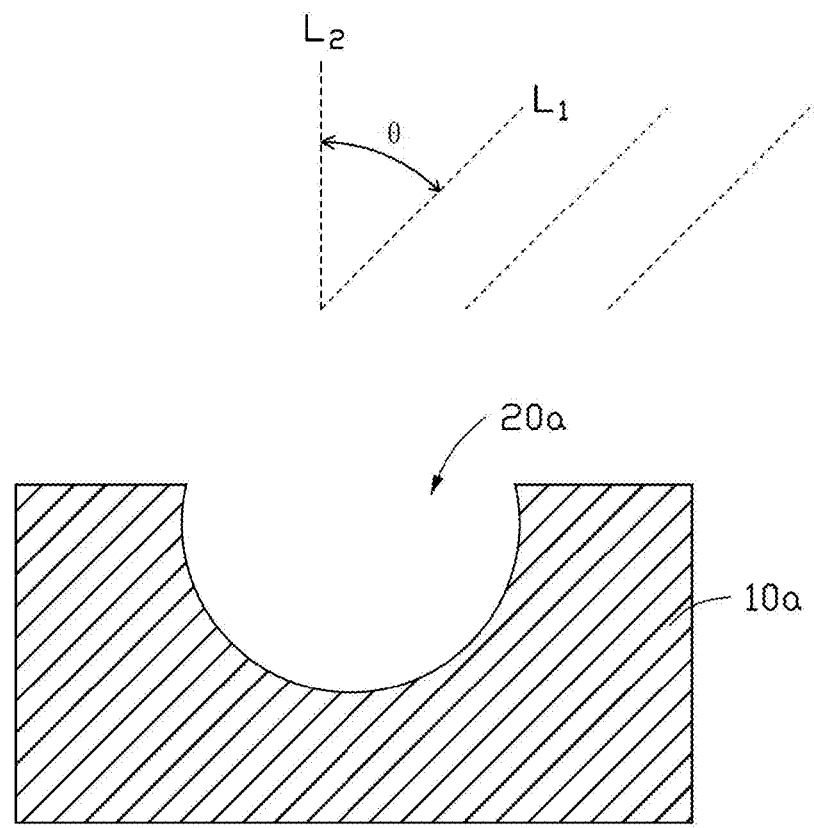
FIG. 28 is a schematic diagram showing an included angle θ between a normal vector of a plane where the metal substrate is located and a sputtering direction of a target material when a glancing angle physical vapor deposition is performed on the metal substrate of FIG. 27, in accordance with some embodiments of the present disclosure.
Figure 29:
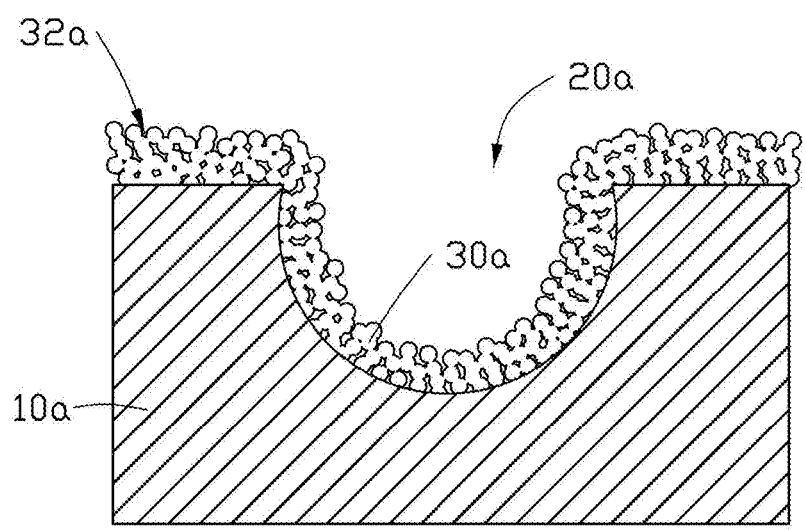
FIG. 29 is a simplified cross-sectional side view showing protrusions after performing the glancing angle physical vapor deposition on the metal substrate of FIG. 27, in accordance with some embodiments of the present disclosure.

Step X32, in some embodiments illustrated in FIGS. 28 and 29, at least one protrusion 30a is formed on at least one of a portion of the surface of the metal substrate 10a without the at least one first hole 20a and an inner surface defining the at least one first hole 20a by glancing angle physical vapor deposition, and the at least one protrusion 30a surrounds to form at least one second hole 32a.

Step X33, in some embodiments illustrated in FIG. 20, putting the metal substrate 10a with the at least one second hole 32a into a first electrolyte as an anode, and putting a first cathode conductor in the first electrolyte as a cathode; then applying electricity on the metal substrate 10a and the first cathode conductor to perform an anodic oxidation treatment, thereby forming at least one third hole 40a in at least one of a surface of the at least one protrusion 30a and a surface of the metal substrate 10a exposed from the at least one protrusion 30a.

In step X31, the at least one first hole 20a may be formed in the surface of the metal substrate 10a by chemical corrosion or electrochemical electrolysis.

A method of forming the first hole 20a by electrochemical electrolysis is described as follow.

Specifically, the metal substrate 10a is put into a second electrolyte as an anode, and a second cathode conductor is put into the second electrolyte as a cathode. Then, electricity is applied on the metal substrate 10a and the first cathode conductor to perform an electrolysis treatment on the metal substrate 10a to electrolyze the metal substrate 10a, thereby forming at least one first hole 20a. The second electrolyte may include an acid selected from a group consisting of hydrochloric acid, nitric acid, sulfuric acid, and any combination thereof.

According to some embodiments, before performing the electrolysis treatment on the metal substrate 10a, the method of forming the first hole 20a may further include a step of cleaning the metal substrate 10a. According to some embodiments, the step of cleaning the metal substrate 10a includes degreasing, alkali etching, and black film removal in that sequence.

Specifically, the metal substrate 10a is put in a degreasing agent for a degreasing treatment to remove greasy dirt on the surface of the metal substrate 10a. A temperature of the degreasing treatment may be in a range of 40° C. to 70° C., and a time of the degreasing treatment may be in a range of 3 min to 10 min. The metal substrate 10a after the degreasing treatment is put in a sodium hydroxide solution for an alkali etching treatment to remove oxides on the surface of the metal substrate 10a. A temperature of the alkali etching treatment may be in a range of 40° C. to 70° C., and a time of the alkali etching treatment may be in a range of 1 min to 2 min. The metal substrate 10*a* after the alkali etching treatment is put in a nitric acid solution with a mass fraction of 10% to 40% for a black film removal treatment to further removing residual oxides on the surface of the metal substrate 10*a* after the alkali etching treatment. The black film removal treatment may be treated at a room temperature for 1 min to 2 min.

The method of forming the first hole 20*a* are not limited to the above example.

In step X32, a plurality of protrusions 30*a* are formed on the portion of the surface of the metal substrate 10*a* without the at least one first hole 20*a* and the inner surface defining the at least one first hole 20*a* by glancing angle physical vapor deposition. A material of the plurality of protrusions 30*a* includes a metal material selected from a group consisting of aluminum, titanium, chromium, indium, and any combination thereof. At least one gap is formed between the plurality of protrusions 30*a*, and the at least one gap is the at least one second hole 32*a*.

By means of glancing angle physical vapor deposition, a plating material containing the metal material is vaporized, and the vaporized plating material is sputtered in a form of atoms, molecules or ions to form the plurality of protrusions 30*a* including the metal material on the metal substrate 10*a*, so that a bonding force between the plurality of protrusions 30*a* and the metal substrate 10*a* is strong. At the same time, the plurality of protrusions 30*a* are porous and misaligned stacked structures, which is beneficial to increase a pull strength between the metal product 100*a* and a material product 210*a* formed on the metal product 100*a*.

According to some embodiments, an included angel between a sputtering direction $L_1$ of a target material of the glancing angle physical vapor deposition and a normal vector $L_2$ of a plane where the metal substrate is located is defined as $\theta$. The included angle $\theta$ satisfies $30°\leq\theta<90°$. According to some embodiments, a lower limit of the included angle $\theta$ is one of 33°, 37°, 45°, 54°, 66°, 72°, 83°, and 88°. An upper limit of the included angle $\theta$ is one of 35°, 39°, 47°, 55°, 68°, 75°, 85°, and 89°. The lower limit of the included angle $\theta$ is less than or equal to the upper limit of the included angle $\theta$.

The included angle $\theta$ can be adjusted as needed during glancing angle physical vapor deposition, so that a morphology and a density of the plurality of protrusions 30*a* are changed, and the plurality of protrusions 30*a* face different directions. Thus, a morphology, a density, and an orientation of each of the second holes 32*a* are controllably changed. The included angle $\theta$ is greater, the density of the second holes 32*a* is greater.

According to some embodiments, a temperature of the glancing angle physical vapor deposition may be in a range of 100° C. to 120° C. First, a titanium layer may be deposited on the portion of the surface of the metal substrate 10*a* without the at least one first hole 20*a* and the inner surface defining the at least one first hole 20*a*, then an aluminum layer may be deposited, thereby obtaining the plurality of protrusions 30*a*. The above is only an example, but not as a limitation.

In step X33, the first electrolyte may include an acid selected from a group consisting of sulfuric acid, oxalic acid, and any combination thereof. During the anodic oxidation treatment, part of the material of the protrusions 30*a* and part of the material of the metal substrate 10*a* react to form the third holes 40*a*. At the same time, the part of the material of the protrusions 30*a* and the part of the material of the metal substrate 10*a* are oxidized to form oxide on the inner surface defining the third holes 40*a*.

According to some embodiments, the metal substrate 10*a* with the at least one second hole 32*a* is put in a mixed solution containing sulfuric acid and oxalic acid for the anodic oxidation treatment. A temperature of the anodic oxidation treatment may be in a range of 10° C. to 40° C. A time of the anodic oxidation treatment may be in a range of 5 min to 20 min. A voltage of the anodic oxidation treatment may be in a range of 5V to 20V. The above is only an example, but not as a limitation.

The glancing angle physical vapor deposition may be adjusted to form the plurality of protrusions 30*a* with different orientations. Orientations of the third holes 40*a* formed in the surface of the plurality of protrusions 30*a* may also be different. The plurality of protrusions 30*a* with different orientations and the third holes 40*a* with different orientations may improve increase a pull strength between the metal product 100*a* and the material product 210*a* formed on the metal product 100*a*.

Figure 30:
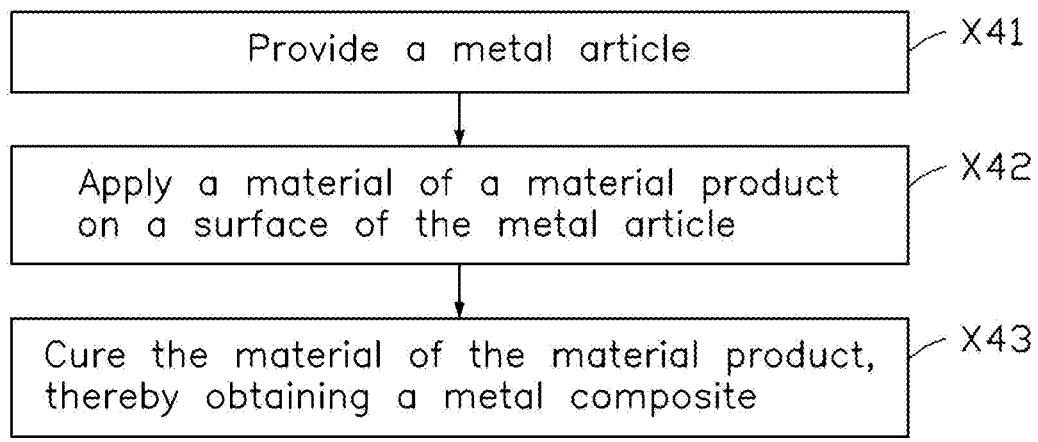
FIG. 30 is a flowchart of a method for manufacturing a metal composite, in accordance with some embodiments of the present disclosure.

According to some embodiments, a method for manufacturing the metal composite 200*a* is provided. In some embodiments illustrated in FIG. 30, a flowchart of a method for manufacturing the metal composite 200*a* includes following steps.

Step X41, providing a metal product 100*a*.

Step X42, applying a material of a material product 210*a* on a surface of the metal product 100*a*.

Step X43, curing the material of the material product 210*a*, thereby obtaining a metal composite 200*a*.

In step X41, the metal product 100*a* is manufactured by the above method for manufacturing the metal product 100*a*.

In step X42, the material of the material product 210*a* may be selected form a group consisting of plastic, metal, ceramic, glass, oxide, and any combination thereof.

In step X43, the material product 210*a* is applied to the surface of the metal substrate 10*a*, and at least a part of the material product 210*a* enters the at least one first hole 20*a*, the at least one second hole 32*a*, and the at least one third hole 40*a*. After the material product 210*a* is cured, the part of the material product 210*a* located in the at least one first hole 20*a*, the at least one second hole 30*a*, and the at least one third hole 40*a* forms a combining portion 215*a* to combine the material product 210*a* and metal product 100*a*, thus the metal composite 200*a* is obtained.

The material of the material product 210*a* may be processed by methods which are set according to properties or a status of the material of the material product 210*a*.

For example, the material of the material product 210*a* is metal and in a particle state, the material of the material product 210*a* may be processed by a laser melting method to form the material product 210*a*.

For example, the material of the material product 210*a* is plastic, when the material is in a liquid/solution state, the material may be processed by evaporating a solvent of the liquid/solution to form the material product 210*a*. When the material is in a particle state, the material may be processed by a heating to melt the material product 210*a*. When the material is in a molten state, the material may be molded to form the material product 210*a*. When the material is in a gas state, the material may be formed by a gas in-situ polymerization method.

For example, the material of the material product 210*a* is a ceramic and is in a particle state, the material may be processed by a sintering method or a bonding method with a bonding agent to form the material product 210*a*.

For example, the material of the material product 210*a* is glass, when the material is in a particle state, the material may be processed by a heat melting method to form the material product 210*a*; when the material is in a molten state, the material may be processed by a cooling method to form the material product 210*a*.

The materials and processing methods of the material of the material product 210*a* are not limited to the above examples.

According to some embodiments, the metal product 100*a* is put in a heated mold, a molten plastic is injected on the surface of the metal product 100*a* and enters into the at least one first hole 20*a*, the at least one second hole 32*a*, and the at least one third hole 40*a*, and the metal composite 200*a* is obtained by injection molding.

In the method for manufacturing the metal product 100*a* and the method for manufacturing the metal composite 200*a*, the plurality of protrusions 30*a* with strong bonding strength to the metal substrate 10*a* are formed in a controllable manner on the surface of the metal substrate 10*a* with the at least one micron-sized first hole 20*a* by glancing angle physical vapor deposition. Then, the at least one submicron-sized second hole 32*a* is formed between the plurality of protrusions 30*a*. Finally, at least one nano-sized third hole 40*a* is formed by the anodic oxidation treatment. Since the material product 210*a* is embedded in the at least one first hole 20*a*, the at least one second hole 32*a*, and the at least one third hole 40*a*, the bonding strength between the metal product 100*a* and the material product 210*a* is enhanced. At the same time, since the triple (or three-layer) composite structure includes a complicated pore structure, it is more difficult for external gases and liquids to pass through the triple (or three-layer) composite structure, thereby improving an air tightness and liquid tightness of the metal composite 200*a*.

It is to be understood, even though information and advantages of the present embodiments have been set forth in the foregoing description, together with details of the structures and functions of the present embodiments, the disclosure is illustrative only; changes may be made in detail, especially in matters of shape, size, and arrangement of parts within the principles of the present embodiments to the full extent indicated by the plain meaning of the terms in which the appended claims are expressed.

What is claimed is:

1. A metal product, comprising:
    a metal substrate;
    at least one first hole defined in a surface of the metal substrate and formed by chemical corrosion or electrochemical electrolysis;
    a plurality of second holes defined in a portion of the surface of the metal substrate without the first hole and an inner surface defining the at least one first hole, wherein the plurality of second holes are formed by surrounding a plurality of protrusions, the plurality of protrusions are located on at least one of the portion of the surface of the metal substrate without the at least one first hole and the inner surface defining the at least one first hole, the plurality of protrusions are formed by glancing angle physical vapor deposition; and
    a plurality of third holes formed by an anodic oxidation treatment and defined in a portion of the surface of the metal substrate without the at least one first hole and without the plurality of second holes, a portion of the inner surface defining the at least one first hole without the plurality of second holes, and an inner surface defining the plurality of second holes.

2. The metal product of claim 1, wherein the plurality of third holes are formed in a surface of the plurality of protrusions, and a surface of the metal substrate exposed from the plurality of protrusions.

3. The metal product of claim 2, wherein a material of the inner surface defining the at least one first hole and exposed from the plurality of protrusions comprises oxide.

4. The metal product of claim 1, wherein a diameter of each of the at least one first hole is $R_1$, and 50 µm≤$R_1$≤150 µm.

5. The metal product of claim 1, wherein a diameter of each of the plurality of second holes is $R_2$, and 100 nm≤$R_2$≤5000 nm.

6. The metal product of claim 1, wherein a diameter of each of the plurality of third holes is $R_3$, and 20 nm≤$R_3$≤70 nm.

7. The metal product of claim 1, wherein the metal substrate comprises a sponge-like structure formed by the plurality of second holes and the inner surface defining the plurality of second holes.

8. The metal product of claim 1, wherein each of the plurality of second holes comprises an opening, directions of openings of the plurality of second holes are different from each other.

9. The metal product of claim 1, wherein shapes of the plurality of second holes are different from each other.

10. The metal product of claim 1, wherein each of the plurality of third holes comprises an opening, directions of the openings of the plurality of third holes are different from each other.

11. A metal composite, comprising:
    a metal product of claim 1; and
    a material product formed on the metal product;
    wherein the material product comprises a combining portion arranged in the at least one first hole, the plurality of second holes, and the plurality of third holes to be combined with the metal product.

12. The metal composite of claim 11, wherein the material product is made of a material selected form a group consisting of plastic, metal, ceramic, glass, oxide, and any combination thereof.

13. The metal composite of claim 12, wherein the combining portion comprises at least one first part embedded into the at least one first hole, at least one second part diverging from the at least one first part, and at least one third part diverging from the at least one first part and the at least one second part; the at least one second part is embedded into the plurality of second holes, the at least one third part is embedded into the plurality of third holes.

14. The metal composite of claim 12, wherein the combining portion comprises a main body and at least one branch structure diverging from the main body.

15. The metal composite of claim 14, wherein the combining portion comprises a plurality of branch structures, shapes of the plurality of branch structures are different from each other.

16. The metal composite of claim 15, wherein the combining portion comprises a plurality of branch structures, divergence directions of the plurality of branch structures are different from each other.

\* \* \* \* \*